US012529975B2

(12) United States Patent
Yamashita et al.

(10) Patent No.: US 12,529,975 B2
(45) Date of Patent: Jan. 20, 2026

(54) TONER, DEVELOPER, TONER STORAGE UNIT, IMAGE FORMING APPARATUS, AND IMAGE FORMING METHOD

(71) Applicants: Taishi Yamashita, Shizuoka (JP); Yohichi Kitagawa, Shizuoka (JP); Tsukiko Takahashi, Shizuoka (JP); Mitsuaki Hirose, Shizuoka (JP); Daisuke Inoue, Shizuoka (JP)

(72) Inventors: Taishi Yamashita, Shizuoka (JP); Yohichi Kitagawa, Shizuoka (JP); Tsukiko Takahashi, Shizuoka (JP); Mitsuaki Hirose, Shizuoka (JP); Daisuke Inoue, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 515 days.

(21) Appl. No.: 18/084,579

(22) Filed: Dec. 20, 2022

(65) Prior Publication Data

US 2023/0195005 A1 Jun. 22, 2023

(30) Foreign Application Priority Data

Dec. 22, 2021 (JP) ................................. 2021-208110

(51) Int. Cl.
*G03G 9/097* (2006.01)
*G03G 9/08* (2006.01)
*G03G 9/087* (2006.01)
*G03G 15/08* (2006.01)

(52) U.S. Cl.
CPC ....... *G03G 9/09791* (2013.01); *G03G 9/0819* (2013.01); *G03G 9/08711* (2013.01); *G03G 15/0865* (2013.01)

(58) Field of Classification Search
CPC ............. G03G 9/09791; G03G 9/0819; G03G 9/08711; G03G 15/0865
See application file for complete search history.

(56) References Cited

U.S. PATENT DOCUMENTS

| | | | |
|---|---|---|---|
| 2003/0125479 A1 | 7/2003 | Kinsho et al. |
| 2007/0297836 A1 | 12/2007 | Kawasaki et al. |
| 2008/0038649 A1 | 2/2008 | Hirose et al. |
| 2008/0124638 A1 | 5/2008 | Hirose et al. |
| 2008/0318142 A1 | 12/2008 | Kawasaki et al. |

(Continued)

FOREIGN PATENT DOCUMENTS

| | | |
|---|---|---|
| JP | 2001-337517 | 12/2001 |
| JP | 2002-284881 | 10/2002 |

(Continued)

OTHER PUBLICATIONS

U.S. Appl. No. 17/814,644, filed Jul. 25, 2022.

*Primary Examiner* — Mark F. Huff
*Assistant Examiner* — Boone Alexander Evans
(74) *Attorney, Agent, or Firm* — XSENSUS LLP

(57) ABSTRACT

A toner includes toner particles. Each of the toner particles includes a toner base particle including a binder resin, resin particles covering the toner base particle, and zinc stearate particles serving as an external additive. In each of the toner particles, a coverage rate of the toner base particle with the resin particles is 30% or greater and 70% or less. The zinc stearate particles have a volume average particle diameter of 3 μm or greater and 20 μm or less.

9 Claims, 4 Drawing Sheets

(56) References Cited

U.S. PATENT DOCUMENTS

| | | | | |
|---|---|---|---|---|
| 2010/0150606 | A1 | 6/2010 | Tamoto et al. | |
| 2010/0189468 | A1 | 7/2010 | Nakasha | |
| 2010/0203443 | A1* | 8/2010 | Okita | G03G 9/09783 430/108.7 |
| 2010/0260513 | A1 | 10/2010 | Kawasaki et al. | |
| 2010/0330475 | A1 | 12/2010 | Tamoto et al. | |
| 2011/0003244 | A1 | 1/2011 | Inoue et al. | |
| 2011/0059393 | A1 | 3/2011 | Tamoto et al. | |
| 2011/0065033 | A1 | 3/2011 | Uchinokura et al. | |
| 2011/0129773 | A1 | 6/2011 | Shu et al. | |
| 2011/0223532 | A1 | 9/2011 | Sugimoto et al. | |
| 2011/0262856 | A1 | 10/2011 | Sugimoto et al. | |
| 2011/0286777 | A1 | 11/2011 | Sugino et al. | |
| 2011/0305986 | A1 | 12/2011 | Ogawa et al. | |
| 2012/0064445 | A1 | 3/2012 | Kojima et al. | |
| 2012/0288299 | A1 | 11/2012 | Uchinokura et al. | |
| 2012/0321348 | A1 | 12/2012 | Toriu et al. | |
| 2013/0022371 | A1 | 1/2013 | Kusahara et al. | |
| 2013/0022902 | A1 | 1/2013 | Shimoyama et al. | |
| 2013/0059242 | A1 | 3/2013 | Asano et al. | |
| 2013/0059243 | A1 | 3/2013 | Hirose et al. | |
| 2013/0196260 | A1 | 8/2013 | Yoshida et al. | |
| 2013/0196261 | A1 | 8/2013 | Uchinokura et al. | |
| 2013/0224648 | A1 | 8/2013 | Honda et al. | |
| 2013/0243483 | A1 | 9/2013 | Hirose et al. | |
| 2013/0243488 | A1 | 9/2013 | Kojima et al. | |
| 2013/0244155 | A1 | 9/2013 | Satoh et al. | |
| 2013/0244156 | A1 | 9/2013 | Kojima et al. | |
| 2013/0244158 | A1 | 9/2013 | Awamura et al. | |
| 2013/0251401 | A1 | 9/2013 | Asano et al. | |
| 2013/0330104 | A1 | 12/2013 | Shimoyama et al. | |
| 2014/0093820 | A1 | 4/2014 | Satoh et al. | |
| 2016/0195826 | A1 | 7/2016 | Kimura et al. | |
| 2016/0195827 | A1 | 7/2016 | Murayama et al. | |
| 2016/0195828 | A1 | 7/2016 | Satoh et al. | |
| 2016/0378006 | A1 | 12/2016 | Itoh et al. | |
| 2017/0212435 | A1 | 7/2017 | Hirose et al. | |
| 2017/0277078 | A1 | 9/2017 | Matsumoto | |
| 2018/0052403 | A1 | 2/2018 | Inoue et al. | |
| 2018/0157185 | A1* | 6/2018 | Tsuchihashi | G03G 9/09371 |
| 2018/0196368 | A1* | 7/2018 | Tsuchihashi | G03G 9/09378 |
| 2019/0011845 | A1 | 1/2019 | Toshine et al. | |
| 2019/0271927 | A1 | 9/2019 | Inoue et al. | |
| 2019/0278192 | A1 | 9/2019 | Shibata et al. | |
| 2020/0103775 | A1 | 4/2020 | Kitagawa et al. | |
| 2020/0233325 | A1 | 7/2020 | Nakamura et al. | |
| 2021/0063916 | A1 | 3/2021 | Takei et al. | |
| 2021/0116830 | A1 | 4/2021 | Takei et al. | |
| 2021/0157251 | A1 | 5/2021 | Sakamoto | |
| 2021/0173337 | A1 | 6/2021 | Inoue et al. | |
| 2022/0057725 | A1 | 2/2022 | Inoue et al. | |
| 2022/0155699 | A1 | 5/2022 | Kitagawa et al. | |
| 2022/0326632 | A1 | 10/2022 | Makabe et al. | |

FOREIGN PATENT DOCUMENTS

| | | |
|---|---|---|
| JP | 2007-233030 | 9/2007 |
| JP | 2010-169987 | 8/2010 |
| JP | 5166164 | 3/2013 |
| JP | 2017-173750 | 9/2017 |
| JP | 2019-099809 | 6/2019 |
| JP | 2019-143128 | 8/2019 |
| JP | 2019-158901 | 9/2019 |
| JP | 2021-085973 | 6/2021 |
| JP | 2021-096328 | 6/2021 |

* cited by examiner

TONER, DEVELOPER, TONER STORAGE UNIT, IMAGE FORMING APPARATUS, AND IMAGE FORMING METHOD

CROSS-REFERENCE TO RELATED APPLICATION

The present application claims priority under 35 U.S.C. § 119 to Japanese Patent Application No. 2021-208110, filed Dec. 22, 2021, the contents of which are incorporated herein by reference in their entirety.

BACKGROUND OF THE INVENTION

1. Field of the Invention

The disclosures herein generally relate to a toner, a developer, a toner storage unit, an image forming apparatus, and an image forming method.

2. Description of the Related Art

In recent years, the following characteristics or properties of toners have been desired. Namely, desired characteristics or properties of the toners are small particle sizes and hot offset resistance for forming high-quality output images; low-temperature fixability for achieving energy saving; and heat-resistant storage stability for resisting high temperature and high humidity conditions during storage or transportation after production of the toner. Improvement in low-temperature fixability of a toner is particularly important because energy consumption during fixing constitutes the majority of energy consumption of an entire image formation process.

Materials having low melting points are used to produce a toner for assuring low-temperature fixability of the toner. The toner produced using the materials having low melting points however has a problem of inadequate heat-resistant storage stability. There is a trade-off between achieving low-temperature fixability and impairing heat-resistant storage stability.

Therefore, the following production method of composite resin particles has been proposed for achieving both low-temperature fixability and heat-resistant storage stability. In the proposed production method, resin particles each including two kinds of resins as constituent components are deposited on a surface of each of toner base particles to form composite resin particles, and part of or a whole of the resin particles are removed to produce the composite resin particles (see, for example, Japanese Unexamined Patent Application Publication Nos. 2002-284881, 2019-099809, and 2019-143128).

Moreover, depositing resin particles on surfaces of toner base particles has been proposed (see, for example, Japanese Unexamined Patent Application Publication No. 2007-233030).

SUMMARY OF THE INVENTION

In one embodiment, a toner includes toner particles. Each of the toner particles includes a toner base particle including a binder resin, resin particles covering the toner base particle, and zinc stearate particles serving as an external additive. In each of the toner particles, a coverage rate of the toner base particle with the resin particles is 30% or greater and 70% or less. The zinc stearate particles have a volume average particle diameter of 3 μm or greater and 20 μm or less.

DESCRIPTION OF THE PREFERRED EMBODIMENTS

Figure 1:
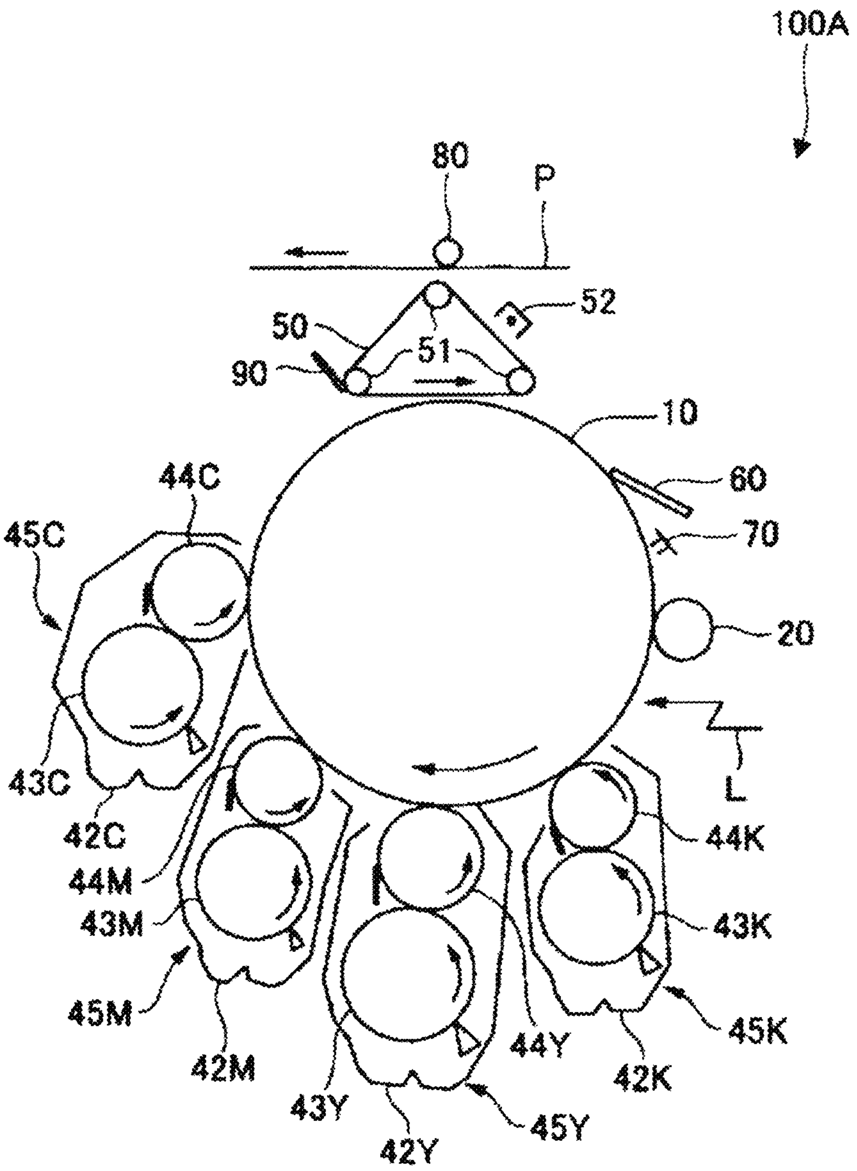
FIG. 1 is a schematic view illustrating an example of an image forming apparatus using the toner of the present disclosure.

In the following, embodiments of the present invention will be described with reference to the accompanying drawings.

Further, the present invention is not limited to these embodiments, but various variations and modifications may be made without departing from the scope of the present invention.

(Toner)

The toner of the present disclosure includes toner particles. Each of the toner particles include a toner base particle including a binder resin, resin particles covering the toner base particle, and zinc stearate particles serving as an external additive. The toner may further include other components according to the necessity.

The toners disclosed in the related art (Japanese Unexamined Patent Application Publication Nos. 2002-284881, 2019-099809, 2019-143128, and 2007-233030) are proposed for achieving both low-temperature fixability and heat-resistant storage stability, but the disclosed toners have a problem that excellent cleaning properties against a photoconductor (i.e., an electrostatic latent image bearer) may not be assured. As cleaning of the photoconductor, there are a blade system using a cleaning blade and a roller system using a roller. During the cleaning according to the above-mentioned systems, friction is caused between the photoconductor and the cleaning blade or roller. The friction generated between the photoconductor and the cleaning blade or roller may cause a cleaning failure, leading to a defect in a resulting image. In order to reduce cleaning failures, zinc stearate particles may be added to the toner as an external additive as well as silica so that a surface of a photoconductor is coated with a film of the zinc stearate to reduce friction between the photoconductor and the cleaning blade etc. However, the zinc stearate particles are easily embedded in surfaces of the toner base particles. As a result, the zinc stearate particles are not easily detached from the toner base particles inside a system (e.g., an image forming apparatus) and therefore an adequate coating effect may not be achieved.

Accordingly, the present inventors have diligently conducted research and have found the following insight. That is, a phenomenon that zinc stearate particles are embedded in each toner base particle can be minimized by covering the toner base particle with resin particles at a coverage rate of 30% or greater and 70% or less. Moreover, covering each of the toner base particles with the resin particles makes the toner base particles hard, while maintaining low-temperature fixability of the toner. Accordingly, both low-temperature fixability and heat-resistant storage stability are achieved.

Moreover, the present inventors have found the following insight. When the volume average particle diameter of the zinc stearate particles is 3 μm or greater and 20 μm or less, the phenomenon that the zinc stearate particles are embedded in each toner base particle is minimized and an amount of the zinc stearate particles captured by the cleaning blade etc. is reduced, consequently achieving excellent cleaning properties.

An object of the present disclosure is to provide a toner that achieves both low-temperature fixability and heat-resistant storage stability and has excellent cleaning properties.

The present disclosure can provide a toner that achieves both low-temperature fixability and heat-resistant storage stability and has excellent cleaning properties.

According to the toner of the present disclosure, in each of the toner particles, the coverage rate of the toner base particle with the resin particles is 30% or greater and 70% or less, and more preferably 40% or greater and 60% or less. When the coverage rate is 30% or greater, heat-resistant storage stability of a resulting toner improves. Moreover, a phenomenon that the zinc stearate particles, which serve as an external additive, are embedded in each toner base particle is minimized, consequently achieving excellent cleaning properties. When the coverage rate is 70% or less, the zinc stearate particles are deposited on a surface of each toner base particle without any difficulties, and therefore excellent cleaning properties are achieved. Moreover, heat is easily transmitted to the toner when the toner is fixed to a recording medium, consequently achieving excellent low-temperature fixability.

When the coverage rate is 30% or greater and 70% or less, moreover, zinc stearate particles serving as the external additive are suitably deposited on a surface of each toner base particle, and a certain amount of the zinc stearate particles is detached from the toner base particles during cleaning. As a result, the zinc stearate particles are deposited on a contact surface between a cleaning blade and a photoconductor to achieve excellent cleaning properties. Owing to the excellent cleaning properties as mentioned, occurrence of filming is minimized.

A measuring method of the coverage rate is not particularly limited, and may be appropriately selected in accordance with the intended purpose. For example, the coverage rate may be measured by observing and capturing an image of resin particles present on a surface of a toner base particle by means of a scanning electron microscope (SEM), and calculating a ratio of the area of the resin particles to the area of the toner base particle from the captured image using image-processing software.

A specific measuring method of the coverage rate will be described hereinafter.

The coverage rate is measured by, after performing an external additive-releasing treatment that removes the external additive as much as possible using ultrasonic waves, observing the resin particles covering each toner base particle under a scanning electron microscope (SEM).

The external additive-releasing treatment is carried out by releasing the external additive particles from the toner base particles as in [1] and [2] below under the conditions described in [Ultrasonic wave conditions].

[1] A 100 mL screw vial is charged with 50 mL of a 5% by mass surfactant aqueous solution (product name: NOIGEN ET-165, available from DKS Co., Ltd.) and 3 g of the toner, and the surfactant aqueous solution and the toner are mixed to prepare a dispersion solution. The resulting dispersion solution is agitated by gently shaking the vial in up-down and left-right motion. Then, the resulting dispersion solution is stirred by means of a ball mill for 30 minutes to homogeneously disperse the toner in the dispersion solution.

[2] Then, ultrasonic energy is applied to the resulting dispersion solution by means of an ultrasonic homogenizer (product name: Homogenizer, type: VCX750, CV33, available from SONICS & MATERIALS, INC.) under [Ultrasonic wave conditions] below.

[Ultrasonic Wave Conditions]

Duration of application of vibrations: continuous 60 minutes

Amplitude: 40 W

Onset temperature of application of vibrations: 23° C.±1.5° C.

Temperature during application of vibrations: 23° C.±1.5° C.

[3](1) The dispersion liquid is filtered by vacuum filtration using filter paper (product name: Quantitative filter paper (No. 2, 110 mm), available from Advantec Toyo Kaisha, Ltd.). The resulting filtration cake is washed twice with ion-exchanged water, followed by performing filtration to remove free additive particles. Then, the collected base particles of the toner sample are dried.

(2) An SEM image of the base particles of the toner sample collected in (1) is captured by a scanning electron microscope (SEM). Every time an SEM image is captured, another SEM image is also captured from the direction orthogonal to the direction from which the first SEM image is captured. In this manner, 20 or more SEM images are captured in total. First, a backscattered electron image is observed to detect the external additive and/or filler particles including Si.

(3) The image of (2) is binarized using image processing software (ImageJ) to exclude the external additive and/or filler particles.

Next, the section of the toner identical to the observation section in (2) is observed to acquire a secondary electron image. Since the resin particles cannot be detected on the backscattered electron image and can be detected only on the secondary electron image, the secondary electron image is compared to the image acquired in (3) to determine, as the resin particles, the particles present in the regions other than the regions of the residual external additive and/or filler particles (other than the regions excluded in (3)).

[Image Capturing Conditions]

Scanning electron microscope: SU-8230 (available from Hitachi High-Tech Corporation)

Image capturing magnification: 35,000×

Captured image: secondary electron (SE(L)) image and backscattered electron (BSE) image Acceleration voltage: 2.0 kV Acceleration current: 1.0 μA Probe current: Normal Focus mode: UHR WD: 8.0 mm According to the toner of the present disclosure, the volume average particle diameter of the zinc stearate particles serving as the external additive is 3 μm or greater and 20 μm or less, and preferably 5 μm or greater and 15 μm or less. When the volume average particle diameter of the zinc stearate particles is 3 μm or greater, a phenomenon that the zinc stearate particles are embedded in each toner base particle can be minimized so that the zinc stearate particles may detach from the toner base particles. As a result, an effect of coating a photoconductor with the zinc stearate particles improves, thus assuring excellent cleaning properties. When the volume average particle diameter of the zinc stearate particles is 20 μm or less, an amount of the zinc stearate particles captured by a cleaning blade is reduced, consequently achieving excellent cleaning properties.

A measuring method of the volume average particle diameter of the zinc stearate particles is not particularly limited, and may be appropriately selected in accordance with the intended purpose. For example, the zinc stearate particles are observed and an image of the zinc stearate particles is captured by a scanning electron microscope (SEM), and the maximum length of the randomly-selected zinc stearate particle (the number of particles measured: 100 particles or more and 200 particles or less) is measured from the captured SEM image using image analysis software ImageJ to calculate the volume average particle diameter of the zinc stearate particles.

<Resin Particles>

The resin particles cover a surface of the toner base particle in each of the toner particles.

The toner base particle covered with the resin particles improves durability. The improvement in the durability of the toner base particle in each of the toner particles leads to excellent heat-resistant storage stability of a resulting toner and reduction in occurrence of a phenomenon that the zinc stearate particles are embedded in each toner base particle.

Each of the resin particles preferably includes a core resin (a core), and a shell resin (a shell) covering at least part of a surface of the core. Each of the resin particles more preferably includes a vinyl-based unit that includes a segment derived from the core resin and a segment derived from the shell resin.

The resin particles are preferably resin particles that are added to or included in an aqueous medium (or an aqueous phase) during production of the toner.

<<Shell Resin>>

The shell resin is preferably a polymer obtained through homopolymerization or copolymerization of molecules of a vinyl monomer.

Examples of the vinyl monomer include the following (1) to (10).

(1) Vinyl Hydrocarbon

Examples of the vinyl hydrocarbon include (1-1) an aliphatic vinyl hydrocarbon, (1-2) an alicyclic vinyl hydrocarbon, and (1-3) an aromatic vinyl hydrocarbon.

(1-1) Aliphatic Vinyl Hydrocarbon

Examples of the aliphatic vinyl hydrocarbon include an alkene and an alkadiene.

Examples of the alkene include ethylene, propylene, and α-olefin.

Examples of the alkadiene include butadiene, isoprene, 1,4-pentadiene, 1,6-hexadiene, and 1,7-octadiene.

(1-2) Alicyclic Vinyl Hydrocarbon

Examples of the alicyclic vinyl hydrocarbon include a monocycloalkene or dicycloalkene, and a dicycloalkadiene. Specific examples of the alicyclic vinyl hydrocarbon include (di)cyclopentadiene, and terpene.

(1-3) Aromatic Vinyl Hydrocarbon

Examples of the aromatic vinyl hydrocarbon include styrene, and hydrocarbyl (e.g., alkyl, cycloalkyl, aralkyl and alkenyl)-substituted styrene.

Specific examples of the hydrocarbyl-substituted styrene include α-methylstyrene, 2,4-dimethylstyrene, and vinyl naphthalene.

(2) Carboxyl Group-Containing Vinyl Monomer and Salts of Carboxyl Group-Containing Vinyl Monomer Examples of the carboxyl group-containing vinyl monomer and salts of the carboxyl group-containing vinyl monomer include a C3-C30 unsaturated monocarboxylic acid (salt), an unsaturated dicarboxylic acid (salt), anhydrides (salts) of the foregoing monomers, and monoalkyl (C1-C24) esters of the foregoing monomers.

Specific examples of the carboxyl group-containing vinyl monomer include: carboxyl group-containing vinyl monomers, such as (meth)acrylic acid, maleic acid (anhydride), monoalkyl maleate, fumaric acid, monoalkyl fumarate, crotonic acid, itaconic acid, monoalkyl itaconate, itaconic acid glycol monoether, citraconic acid, monoalkyl citraconate, and cinnamic acid; and metal salts of the foregoing monomers.

In the present specification, the term "acid (salt)" means acid or a salt of the acid. For example, a C3-C30 unsaturated monocarboxylic acid (salt) means a C3-C30 unsaturated monocarboxylic acid or a salt of a C3-C30 unsaturated monocarboxylic acid.

Examples of the salt include an alkali metal salt (e.g., sodium salt and a potassium salt), an alkaline earth metal salt (e.g., calcium salt and magnesium salt), an ammonium salt, an amine salt, and a quaternary ammonium salt.

In the present specification, the term "(meth)acrylic acid" means methacrylic acid or acrylic acid.

In the present specification, the term "(meth)acryloyl" means methacryloyl or acryloyl.

In the present specification, the term "(meth)acrylate" means methacrylate or acrylate.

(3) Sulfonic Acid Group-Containing Vinyl Monomer, Vinyl Sulfuric Acid Monoester Compound, and Salts of Sulfonic Acid Group-Containing Vinyl Monomer and Vinyl Sulfuric Acid Monoester Compound Examples of the sulfonic acid group-containing vinyl monomer, the vinyl sulfuric acid monoester compound, and salts of the sulfonic acid group-containing vinyl monomer and vinyl sulfuric acid monoester compound include a C2-C14 alkene sulfonic acid (salt), a C2-C24 alkyl sulfonic acid (salt), sulfo(hydroxy)alkyl-(meth)acrylate (salt), sulfo (hydroxy)alkyl-(meth)acrylamide (salt), and alkylallylsulfosuccinic acid (salt).

Examples of the C2-C14 alkene sulfonic acid include vinyl sulfonic acid (salt).

Examples of the C2-C24 alkyl sulfonic acid (salt) include α-methylstyrenesulfonic acid (salt).

Examples of the sulfo(hydroxy)alkyl-(meth)acrylate (salt) include sulfopropyl(meth)acrylate (salt), sulfuric acid ester (salt), and a sulfonic acid group-containing vinyl monomer (salt).

(4) Phosphoric Acid Group-Containing Vinyl Monomer and Salts of Phosphoric Acid Group-Containing Vinyl Monomer Examples of the phosphoric acid group-containing vinyl monomer and salts of the phosphoric acid group-containing vinyl monomer include a (meth)acryloyloxyalkyl (the number of carbon atoms: from 1 through 24) phosphoric acid monoester (salt) and (meth)acryloyloxyalkyl (the number of carbon atoms: from 1 through 24) phosphonic acid (salt).

Examples of the (meth)acryloyloxyalkyl (the number of carbon atoms: from 1 through 24) phosphoric acid monoester (salt) include 2-hydroxyethyl(meth)acryloyl phosphate (salt), and phenyl-2-acryloyloxyethyl phosphate (salt).

Examples of the (meth)acryloyloxyalkyl (the number of carbon atoms: from 1 through 24) phosphonic acid (salt) include 2-acryloyloxyethylphosphonic acid (salt).

(5) Hydroxyl Group-Containing Vinyl Monomer

Examples of the hydroxyl group-containing vinyl monomer include hydroxystyrene, N-methylol(meth)acrylamide, hydroxyethyl(meth)acrylate, hydroxypropyl(meth)acrylate, polyethylene glycol mono(meth)acrylate, (meth)allyl alcohol, crotyl alcohol, isocrotyl alcohol, 1-buten-3-ol, 2-buten-1-ol, 2-butene-1,4-diol, propargyl alcohol, 2-hydroxyethyl propenyl ether, and sucrose allyl ether.

(6) Nitrogen-Containing Vinyl Monomer

Examples of the nitrogen-containing vinyl monomer include (6-1) an amino group-containing vinyl monomer, (6-2) an amide group-containing vinyl monomer, (6-3) a nitrile group-containing vinyl monomer, (6-4) a quaternary ammonium cation group-containing vinyl monomer, and (6-5) a nitro group-containing vinyl monomer.

Examples of the (6-1) amino group-containing vinyl monomer include aminoethyl (meth)acrylate.

Examples of the (6-2) amide group-containing vinyl monomer include (meth)acrylamide, and N-methyl(meth) acrylamide.

Examples of the (6-3) nitrile group-containing vinyl monomer include (meth)acrylonitrile, cyanostyrene, and cyanoacrylate.

Examples of the (6-4) quaternary ammonium cation group-containing vinyl monomer include quaternized compounds (compounds quaternized using a quaternizing agent, such as methyl chloride, dimethyl sulfate, benzyl chloride, and dimethyl carbonate) of a tertiary amine group-containing vinyl monomer [e.g., dimethylaminoethyl(meth)acrylate, diethylaminoethyl (meth)acrylate, dimethylaminoethyl (meth)acrylamide, diethylaminoethyl (meth)acrylamide, and diallylamine].

Examples of the (6-5) nitro group-containing vinyl monomer include nitrostyrene.

(7) Epoxy Group-Containing Vinyl Monomer

Examples of the epoxy group-containing vinyl monomer include glycidyl (meth)acrylate, tetrahydrofurfuryl (meth) acrylate, and p-vinylphenyl phenyl oxide.

(8) Halogen Element-Containing Vinyl Monomer

Examples of the halogen element-containing vinyl monomer include vinyl chloride, vinyl bromide, vinylidene chloride, allyl chloride, chlorostyrene, bromostyrene, dichlorostyrene, chloromethyl styrene, tetrafluorostyrene, and chloroprene.

(9) Vinyl Ester, Vinyl (Thio)Ether, and Vinyl Ketone

Examples of the vinyl ester include vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzylmethacrylate, phenyl(meth)acrylate, vinyl methoxy acetate, vinyl benzoate, ethyl α-ethoxyacrylate, C1-C50 alkyl group-containing alkyl (meth)acrylate [e.g., methyl (meth)acrylate, ethyl (meth)acrylate, propyl (meth)acrylate, butyl (meth) acrylate, 2-ethylhexyl (meth)acrylate, dodecyl (meth)acrylate, hexadecyl (meth)acrylate, heptadecyl (meth)acrylate, octadecyl (meth)acrylate, eicosyl (meth)acrylate, and behenyl (meth)acrylate)], dialkyl fumarate (where 2 alkyl groups are each a C2-C8 straight-chain or branched-chain alicyclic group), dialkyl maleate (where 2 alkyl groups are each a C2-C8 straight-chain or branched-chain alicyclic group), poly(meth)allyloxy alkane (e.g., diallyloxy ethane, triallyloxy ethane, tetraallyloxy ethane, tetraallyloxy propane, tetraallyloxy butane, and tetrametha-allyloxy ethane), a polyalkylene glycol chain-containing vinyl monomer [e.g., polyethylene glycol (molecular weight: 300) mono(meth) acrylate, polypropylene glycol (molecular weight: 500) monoacrylate, (meth)acrylate of a methyl alcohol ethylene oxide (10 mol) adduct, and (meth)acrylate of a lauryl alcohol ethylene oxide (30 mol) adduct], and poly(meth)acrylate [e.g., poly(meth)acrylate of multivalent alcohol:ethylene glycol di(meth)acrylate, propylene glycol di(meth)acrylate, neopentyl glycol di(meth)acrylate, trimethylolpropane tri (meth)acrylate, and polyethylene glycol di(meth)acrylate].

Examples of the vinyl (thio)ether include vinyl methyl ether.

Examples of the vinyl ketone include methyl vinyl ketone.

(10) Other Vinyl Monomers

Examples of other vinyl monomers include tetrafluoroethylene, fluoroacrylate, isocyanatoethyl (meth)acrylate, and m-isopropenyl-α,α-dimethylbenzyl isocyanate.

The above-listed vinyl monomers (1) to (10) may be used alone or in combination for synthesis of the shell resin.

Considering low-temperature fixability of a resulting toner the shell resin is preferably a styrene-(meth)acrylic acid ester copolymer or a (meth)acrylic acid ester copolymer, and more preferably a styrene-(meth)acrylic acid ester copolymer.

A viscoelastic loss modulus G" of the shell resin at 100° C. with the frequency of 1 Hz is not particularly limited, and may be appropriately selected in accordance with the intended purpose. The viscoelastic loss modulus G" of the shell resin is preferably from 1.5 MPa through 100 MPa, more preferably from 1.7 MPa through 30 MPa, and particularly preferably from 2.0 MPa through 10 MPa.

The viscoelastic loss modulus G" of the shell resin or the below-described core resin at 100° C. with the frequency of 1 Hz can be adjusted by changing constituent monomers used and/or a composition ratio of the constituent monomers, or adjusting polymerization conditions (e.g., an initiator used and an amount of the initiator, a chain-transfer agent used and an amount of the chain-transfer agent, and a reaction temperature).

An acid value of the shell resin is not particularly limited, and may be appropriately selected in accordance with the intended purpose. The acid value of the shell resin is preferably from 75 mgKOH/g through 400 mgKOH/g, and more preferably from 150 mgKOH/g through 300 mgKOH/g. When the acid value of the shell resin is from 75 mgKOH/g through 400 mgKOH/g, toner particles, in which resin particles are deposited on a surface of each of toner base particles, are easily formed, where the resin particles each include, as a constituent component, a vinyl-based unit including a segment derived from the shell resin and a segment derived from the core resin in each resin particle.

The acid value is a theoretical acid value calculated from a molar amount of the acid group included in the constituent monomers and a total weight of the constituent monomers.

The shell resin preferably includes methacrylic acid and/or acrylic acid.

An amount of the methacrylic acid and/or acrylic acid is not particularly limited, and may be appropriately selected in accordance with the intended purpose. The amount of the methacrylic acid and/or acrylic acid relative to the shell resin is preferably 10% by mass or greater and 60% by mass or less, and more preferably 30% by mass or greater and 50% by mass or less. When the amount of the methacrylic acid and/or acrylic acid is within the above-mentioned ranges, an acid value of the shell resin falls within a range of from 75 mgKOH/g through 400 mgKOH/g.

A glass transition temperature (Tg) of the shell resin is not particularly limited, and may be appropriately selected in accordance with the intended purpose. The glass transition temperature (Tg) of the shell resin is preferably 0° C. or higher and 150° C. or lower, and more preferably 50° C. or higher and 100° C. or lower. When the Tg is 0° C. or higher, excellent heat-resistant storage stability of a resulting toner is assured. When the Tg is 150° C. or lower, excellent low-temperature fixability of a resulting toner is assured.

The glass transition temperature (Tg) of the shell resin is preferably higher than a glass transition temperature (Tg) of the below-described core resin. Since the glass transition temperature (Tg) of the shell resin is higher than the glass transition temperature (Tg) of the core resin, excellent heat-resistant storage stability is imparted to a resulting toner.

Examples of a method of adjusting the glass transition temperature (Tg) of the shell resin to be higher than the glass transition temperature (Tg) of the below-described core resin include a method where monomers used for synthesizing the shell resin, a blending ratio of the monomers, etc. are adjusted.

A measuring method of the glass transition temperature (Tg) of the shell resin is not particularly limited, and may be appropriately selected in accordance with the intended purpose. For example, the glass transition temperature (Tg) of the shell resin can be measured by means of DSC60-A (available from Shimadzu Corporation) according to the method (DSC) specified in ASTM D3418-82.

Specifically, a melting point and glass transition temperature of a sample are measured in the following manner.

First, about 5.0 mg of the sample is placed in a sample container formed of aluminium, the sample container is placed on a holder unit, and the holder unit is set in an electric furnace. Subsequently, the sample is heated from 0° C. to 150° C. in a nitrogen atmosphere at a heating rate of 10° C./min. Then, the sample is cooled from 150° C. to 0° C. at the cooling rate of 10° C./min, followed by heating up to 150° C. at the heating rate of 10° C./min. DSC curves of the above-mentioned heating and cooling processes are measured by means of a differential scanning calorimeter (DSC-60, available from Shimadzu Corporation).

The DSC curve of the first heating is selected from the obtained DSC curves, and a glass transition temperature of the sample from the first heating is determined using an analysis program "endothermic shoulder" installed in the DSC-60 system. Moreover, the DSC curve of the second heating is selected, and a glass transition temperature of the sample from the second heating is determined using the analysis program "endothermic shoulder."

The DSC curve of the first heating is selected from the obtained DSC curves, and a melting point of the sample from the first heating is determined using an analysis program "endothermic peak temperature" installed in the DSC-60 system. Moreover, the DSC curve of the second heating is selected, and a melting point of the sample from the second heating is determined using the analysis program "endothermic peak temperature."

Considering easiness of formation of toner particles, a solubility parameter (SP) value of the shell resin is preferably 9 $(cal/cm^3)^{1/2}$ or greater and 13 $(cal/cm^3)^{1/2}$ or less, more preferably 9.5 $(cal/cm^3)^{1/2}$ or greater and 12.5 $(cal/cm^3)^{1/2}$ or less, and even more preferably 10.5 $(cal/cm^3)^{1/2}$ or greater and 11.5 $(cal/cm^3)^{1/2}$ or less.

The SP value of the shell resin can be adjusted by appropriately changing constituent monomers, and a blending ratio of the constituent monomers.

The SP value can be calculated according to the Fedors method [Polym. Eng. Sci. 14(2)152, (1974)].

A number average molecular weight (Mn) of the shell resin is not particularly limited, and may be appropriately selected in accordance with the intended purpose. The number average molecular weight (Mn) of the shell resin is preferably from 2,000 through 2,000,000, and more preferably from 20,000 through 200,000. When the number average molecular weight of the shell resin is 2,000 or greater, heat-resistant storage stability of a resulting toner improves. When the number average molecular weight of the shell resin is 2,000,000 or less, low-temperature fixability of a resulting toner improves.

A weight average molecular weight (Mw) of the shell resin is not particularly limited, and may be appropriately selected in accordance with the intended purpose. The weight average molecular weight (Mw) of the shell resin is preferably greater than the weight average molecular weight of the below-described core resin, and more preferably greater by 1.5 times or greater, and particularly preferably greater by 2.0 times or greater. Since the weight average molecular weight (Mw) of the shell resin is greater than the weight average molecular weight of the core resin, excellent low-temperature fixability of a resulting toner is assured.

The weight average molecular weight (Mw) of the shell resin is preferably from 20,000 through 20,000,000, and more preferably from 200,000 through 2,000,000. When the weight average molecular weight of the shell resin is 20,000 or greater, heat-resistant storage stability of a resulting toner improves. When the weight average molecular weight of the shell resin is 20,000,000 or less, low-temperature fixability of a resulting toner is not impaired.

For example, the number average molecular weight (Mn) and the weight average molecular weight (Mw) can be measured by gel permeation chromatography (GPC) under the following measuring conditions.

[Measuring Conditions]

Device (as an example): HLC-8120, available from Tosoh Corporation

Columns (as an example): 2 columns, TSK GEL GMH6, available from Tosoh Corporation Measuring temperature: 40° C.

Sample solution: 0.25% by mass tetrahydrofuran solution (from which an insoluble component has been separated by filtration with a glass filter)

Solution injection amount: 100 μL

Detection device: refractive index detector

Reference materials: 12 samples of standard polystyrene (TSKstandard POLYSTYRENE, available from Tosoh Corporation, molecular weights: 500, 1,050, 2,800, 5,970, 9,100, 18,100, 37,900, 96,400, 190,000, 355,000, 1,090,000, and 2,890,000)

<<Core Resin>>

The core resin is preferably a homopolymer or copolymer of molecules of a vinyl monomer.

Examples of the vinyl monomer used for the core resin includes the vinyl monomers listed as examples that can be used for the shell resin.

Considering low-temperature fixability, the core resin is preferably a styrene-(meth)acrylate copolymer or a (meth) acrylate copolymer, and more preferably a styrene-(meth) acrylate copolymer.

A viscoelastic loss modulus G" of the core resin at 100° C. with the frequency of 1 Hz is not particularly limited, and may be appropriately selected in accordance with the intended purpose. The viscoelastic loss modulus G" of the core resin at 100° C. with the frequency of 1 Hz is preferably from 0.01 MPa through 1.0 MPa, more preferably from 0.02 MPa through 0.5 MPa, and even more preferably from 0.05 MPa through 0.3 MPa.

When the viscoelastic loss modulus G" is from 0.01 MPa through 1.0 MPa, toner particles, in which resin particles are deposited on a surface of each of toner base particles, are easily formed, where the resin particles each include, as constituent particles, the shell resin and the core resin.

An acid value of the core resin is not particularly limited, and may be appropriately selected in accordance with the intended purpose. The acid value of the core resin is preferably 0 mgKOH/g or greater and 50 mgKOH/g or less, more preferably 0 mgKOH/g or greater and 20 mgKOH/g or less, and particularly preferably 0 mgKOH/g.

A glass transition temperature (Tg) of the core resin is not particularly limited, and may be appropriately selected in accordance with the intended purpose. The glass transition temperature (Tg) of the core resin is preferably −30° C. or higher and 100° C. or lower, more preferably 0° C. or higher and 80° C. or lower, and particularly preferably 30° C. or higher and 60° C. or lower. When the Tg is −30° C. or higher, excellent heat-resistant storage stability of a resulting toner is assured. When the Tg is 100° C. or lower, excellent low-temperature fixability of a resulting toner is assured.

Considering easiness of formation of toner particles, a solubility parameter (SP) value of the core resin is preferably 8.5 $(cal/cm^3)^{1/2}$ or greater and 12.5 $(cal/cm^3)^{1/2}$ or less, more preferably 9 $(cal/cm^3)^{1/2}$ or greater and 12 $(cal/cm^3)^{1/2}$ or less, and particularly preferably 10 $(cal/cm^3)^{1/2}$ or greater and 11 $(cal/cm^3)^{1/2}$ or less.

The SP value of the core resin can be adjusted by changing constituent monomers and a blending ratio of the constituent monomers.

A number average molecular weight (Mn) of the core resin is not particularly limited, and may be appropriately selected in accordance with the intended purpose. The number average molecular weight (Mn) of the core resin is preferably from 1,000 through 1,000,000, and more preferably from 10,000 through 100,000. When the number average molecular weight of the core resin is 1,000 or greater, heat-resistant storage stability of a resulting toner improves. When the number average molecular weight of the core is 1,000,000 or less, low-temperature fixability of a resulting toner improves.

A weight average molecular weight (Mw) of the core resin is not particularly limited, and may be appropriately selected in accordance with the intended purpose. The weight average molecular weight (Mw) of the core resin is preferably from 10,000 through 10,000,000, and more preferably from 100,000 through 1,000,000. When the weight average molecular weight of the core resin is 10,000 or greater, heat-resistant storage stability of a resulting toner improves. When the weight average molecular weight of the core resin is 10,000,000 or less, low-temperature fixability of a resulting toner improves.

A volume average particle diameter of the resin particles is not particularly limited, and may be appropriately selected in accordance with the intended purpose. The volume average particle diameter of the resin particles is preferably 0.01 μm or greater and 0.06 μm or less, and more preferably 0.01 μm or greater and 0.04 μm or less. When the volume average particle diameter of the resin particles is 0.01 μm or greater, excellent cleaning properties of a resulting toner are assured as well as maintaining low-temperature fixability of the toner.

As a measuring method of the volume average particle diameter, for example, a SEM image is observed and captured by means of a scanning electron microscope (SEM), and the volume average particle diameter is measured from the captured SEM image.

A glass transition temperature (Tg) of the resin particles is not particularly limited, and may be appropriately selected in accordance with the intended purpose. The glass transition temperature (Tg) of the resin particles is preferably 40° C. or higher and 70° C. or lower. When the glass transition temperature (Tg) of the resin particles is 40° C. or higher and 70° C. or lower, fixing of a resulting toner is not impaired, and excellent heat-resistant storage stability of the toner is assured. Examples of a method of adjusting the glass transition temperature Tg of the resin particles to 40° C. or higher and 70° C. or lower include a method of appropriately adjusting a glass transition temperature of a shell resin and a glass transition temperature of a core resin.

As a method of measuring a glass transition temperature Tg of the resin particles, for example, the resin particles present on a surface of each of the toner base particles are physically detached from the toner base particles, or released from the toner base particles using an organic solvent, followed by measuring the glass transition temperature Tg of the resin particles.

A mass ratio of the shell resin to the core resin in the resin particles is not particularly limited, and may be appropriately selected in accordance with the intended purpose. The mass ratio of the shell resin to the core resin is preferably from 5/95 through 95/5, more preferably from 25/75 through 75/25, and particularly preferably from 40/60 through 60/40. When the mass ratio is 5/95 or greater, excellent heat-resistant storage stability of a resulting toner is assured. When the mass ratio is 95/5 or less, toner particles, in each of which the resin particles are deposited on a surface of the toner base particle, are easily formed.

As a production method of the resin particles, any production methods known in the art may be used. Examples of the production method of the resin particles include the following production methods (I) to (V):

(I) a method where monomers for constituting the core resin are polymerized through seeded polymerization using particles of the shell resin as seeds in an aqueous dispersion liquid including the shell resin particles;

(II) a method where monomers for constituting the shell resin are polymerized through seeded polymerization using particles of the core resin as seeds in an aqueous dispersion liquid including the core resin particles;

(III) a method where a mixture of the shell resin and the core resin is emulsified in an aqueous medium to obtain a resin particle aqueous dispersion liquid;

(IV) a method where a mixture of the shell resin and constituent monomers of the core resin is emulsified in an aqueous medium, followed by polymerizing the constituent monomers of the core resin to obtain a resin particle aqueous dispersion liquid; and (V) a method where a mixture of the core resin and constituent monomers of the shell resin is emulsified in an aqueous medium, followed by polymerizing the constituent monomers of the shell resin to obtain a resin particle aqueous dispersion liquid.

Whether the resin particles include the shell resin and the core resin as constituent materials in each particle can be confirmed by observing an element mapping image of a cross-sectional surface of the resin particle by means of any of surface elemental analysis devices known in the art (e.g., TOF-SIMSEDX-SEM), or observing cross-sectional surfaces of the resin particles dyed with a dye suited for functional groups included in the shell resin and the core resin under an electron microscope.

The resin particles obtained by the above-described method may be a mixture of resin particles each including only the shell resin as a constituent resin, and resin particles each including only the core resin as a constituent resin, other than the resin particles each including, as constituent materials, the shell resin and the core resin in each resin particle. In the below-mentioned composite particle formation, the resin particles may be used as the mixture of the resin particles, or only the resin particles may be separated and used.

Specific examples of (I) include: a method where constituent monomers of the shell resin are dripped and polymerized to produce an aqueous dispersion liquid of resin particles of the shell resin, followed by polymerizing constituent monomers of the core resin through seeded polymerization using the shell resin particles as seeds; and a method where the shell resin, which is produced in advance by solution polymerization etc., is emulsified and dispersed in water, followed by polymerizing constituent monomers of the core resin through seeded polymerization using the shell resin particles as seeds.

Specific examples of (II) include: a method where constituent monomers of the core resin are dripped and polymerized to form an aqueous dispersion liquid of particles of the core resin, followed by polymerizing constituent monomers of the shell resin through seeded polymerization using the core resin particles as seeds; and a method where the core resin, which is produced in advance by solution polymerization etc., is emulsified and dispersed in water, followed by polymerizing constituent monomers of the shell resin through seeded polymerization using the core resin particles as seeds.

Specific examples of (III) include a method where a solution or melt of the shell resin and a solution or melt of the core resin, which are produced in advance by solution polymerization etc., are mixed together, followed by emulsifying and dispersing the resulting mixture in an aqueous medium.

Specific examples of (IV) include: a method where the shell resin, which is produced in advance by solution polymerization etc., and constituent monomers of the core resin are mixed, and the resulting mixture is emulsified and dispersed in an aqueous medium, followed by polymerizing the constituent monomers of the core resin; and a method where the shell resin is produced in constituent monomers of the core resin, and the resulting mixture is emulsified and dispersed in an aqueous medium, followed by polymerizing the constituent monomers of the core resin.

Specific examples of (V) include: a method where the core resin, which is produced in advance by solution polymerization etc., is mixed with constituent monomers of the shell resin, and the resulting mixture is emulsified and dispersed in an aqueous medium, followed by polymerizing the constituent monomers of the shell resin; and a method where the core resin is produced in constituent monomers of the shell resin, and the resulting mixture is emulsified and dispersed in an aqueous medium, followed by polymerizing the constituent monomers of the shell resin.

<Zinc Stearate Particles>

The zinc stearate particles are used as an external additive.

A volume average particle diameter of the zinc stearate particles is 3 μm or greater and 20 μm or less, and preferably 5 μm or greater and 15 μm or less. When the volume average particle diameter is 3 μm or greater, a phenomenon that the zinc stearate particles are embedded in each toner base particle is minimized so that the zinc stearate particles are released from the toner base particles to improve an effect of coating the photoconductor with the zinc stearate particles, consequently achieving excellent cleaning properties. When the volume average particle diameter is 20 μm or less, an amount of the zinc stearate particles captured by a cleaning blade is reduced, consequently achieving excellent cleaning properties.

A measuring method of the volume average particle diameter of the zinc stearate particles is not particularly limited, and may be appropriately selected in accordance with the intended purpose. For example, the zinc stearate particles are observed and an image of the zinc stearate particles is captured by means of a scanning electron microscope (SEM). The maximum length of the randomly-selected zinc stearate particle (the number of particles measured: 100 particles or more and 200 particles or less) is measured from the captured SEM image using image analysis software ImageJ, and the average particle diameter of the zinc stearate particles is calculated.

As an industrial production method of the zinc stearate particles, for example, the zinc stearate particles may be produced by a wet method or a dry method.

As the wet method, stearic acid is saponified with sodium hydroxide or caustic potash to form alkali soap, and the alkali soap is allowed to react with zinc to form zinc stearate particles.

As the dry method, stearic acid is allowed to react with oxide or hydroxide of zinc to form zinc stearate particles.

Examples of a method for atomizing the zinc stearate particles include: a method where dried zinc stearate particles are pulverized in a dry system using high pressure air; and a method where zinc stearate particles are dispersed in silicone oil etc. and pulverized in a wet system by means of a bead mill.

As the zinc stearate particles, a commercial product may be used.

Examples of the commercial product include SZ-2000 (available from SAKAI CHEMICAL INDUSTRY CO., LTD.).

An amount of the zinc stearate particles is not particularly limited, and may be appropriately selected in accordance with the intended purpose. The amount of the zinc stearate particles relative to the toner base particles is preferably 0.05% by mass or greater and 0.20% by mass or less, and more preferably 0.08% by mass or greater and 0.16% by mass or less.

A release amount of the zinc, which is derived from the zinc stearate particles, from the toner is not particularly limited, and may be appropriately selected in accordance with the intended purpose. The release amount of the zinc from the toner is preferably 0.005% by mass or greater, and more preferably 0.01% by mass or greater and 0.06% by mass or less. When the release amount of the zinc is 0.005% by mass or greater, a photoconductor is coated with the zinc stearate particles that are detached from the toner particles to improve cleaning properties.

<Toner Base Particle>

In each of the toner particles, the toner base particle includes at least a binder resin, and preferably further includes a colorant, a release agent, and inorganic filler. Each of the toner base particles may further include other components according to the necessity.

<<Binder Resin>>

The binder resin is not particularly limited, and may be appropriately selected in accordance with the intended purpose. Examples of the binder resin include a polyester resin, a styrene-acrylic resin, a polyol resin, a vinyl-based resin, a polyurethane resin, an epoxy resin, a polyamide resin, a polyimide resin, a silicon-based resin, a phenol resin, a melamine resin, a urea resin, an aniline resin, an ionomer resin, and a polycarbonate resin. The above-listed examples may be used alone or in combination. Among the above-listed examples, a polyester resin is preferable because the polyester resin can impart flexibility to a resulting toner.

<<<Polyester Resin>>>

The polyester resin is not particularly limited, and may be appropriately selected in accordance with the intended purpose. Examples of the polyester resin include a crystalline polyester resin, an amorphous polyester resin, and a modified-polyester/amorphous-polyester hybrid resin. The above-listed examples may be used alone or in combination.

—Amorphous Polyester Resin—

The amorphous polyester resin (may be also referred to as "amorphous polyester," "non-crystalline polyester," "a non-crystalline polyester resin," "an unmodified polyester resin," or "a polyester resin component A" hereinafter) is not particularly limited, and may be appropriately selected in accordance with the intended purpose. Examples of the amorphous polyester resin include an amorphous polyester resin obtained through a reaction between a polyol and polycarboxylic acid.

In the present disclosure, the amorphous polyester resin is a polyester resin obtained through a reaction between a polyol and polycarboxylic acid as described above. A modified polyester resin, such as the below-described prepolymer, and a modified polyester resin obtained through a crosslinking reaction and/or an elongation reaction of the prepolymer are not classified as the amorphous polyester resin, but are classified as a modified polyester resin in the present disclosure.

The amorphous polyester is a polyester resin component soluble to tetrahydrofuran (THF).

The amorphous polyester is preferably a linear polyester resin.

Examples of the polyol include a diol.

Examples of the diol include: a bisphenol A (C2-C3) alkylene oxide adduct (the number of moles added: from 1 through 10), such as polyoxypropylene(2.2)-2,2-bis(4-hydroxyphenyl)propane and polyoxyethylene(2.2)-2,2-bis(4-hydroxyphenyl)propane; ethylene glycol; propylene glycol; hydrogenated bisphenol A; and a hydrogenated bisphenol A (C2-C3) alkylene oxide adduct (the number of moles added: from 1 through 10).

The above-listed examples may be used alone or in combination.

Among the above-listed examples, the polyol preferably includes 40 mol % or greater of an alkylene glycol.

Examples of the polycarboxylic acid include a dicarboxylic acid.

Examples of the dicarboxylic acid include adipic acid, phthalic acid, isophthalic acid, terephthalic acid, fumaric acid, maleic acid, and succinic acid (e.g., dodecenyl succinic acid, and octyl succinic acid). The above-listed examples may be used alone or in combination. Among the above-listed examples, the polycarboxylic acid is preferably terephthalic acid.

For adjusting an acid value and a hydroxyl value, the amorphous polyester resin preferably includes a trivalent or higher carboxylic acid, a trivalent or higher alcohol, or a trivalent or higher epoxy compound at terminals of the molecular chain of the amorphous polyester resin. Among the above-listed examples, a trivalent or higher alcohol is preferable because unevenness in a formed image is minimized, and adequate glossiness and image density are assured.

Examples of the trivalent or higher carboxylic acid include trimellitic acid, pyromellitic acid, and acid anhydrides of the foregoing carboxylic acids.

Examples of the trivalent or higher alcohol include glycerin, pentaerythritol, and trimethylolpropane.

Moreover, the amorphous polyester resin component preferably includes a crosslinking component.

As a crosslinking component of the amorphous polyester resin component, a trivalent or higher carboxylic acid or epoxy compound may be used. However, such a crosslinking component may cause unevenness in an image. Accordingly, the crosslinking component more preferably includes a trivalent or higher aliphatic alcohol because adequate glossiness and image density are assured.

The crosslinking component preferably includes a trivalent or higher aliphatic alcohol. Considering glossiness and image density of a resulting fixed image, the crosslinking component more preferably includes a trivalent or tetravalent aliphatic alcohol. The trivalent or tetravalent aliphatic alcohol is preferably a trivalent or tetravalent C3-C10 aliphatic multivalent alcohol component. The crosslinking component may be made up of the trivalent or higher aliphatic alcohol.

The trivalent or higher aliphatic alcohol may be appropriately selected in accordance with the intended purpose. Examples of the trivalent or higher aliphatic alcohol include glycerin, trimethylolethane, trimethylolpropane, pentaerythritol, sorbitol, and dipentaerythritol. The above-listed examples of the trivalent or higher aliphatic alcohol may be used alone or in combination.

A molecular weight of the amorphous polyester resin is not particularly limited, and may be appropriately selected in accordance with the intended purpose. The molecular weight of the amorphous polyester resin is preferably within the following ranges.

A weight average molecular weight (Mw) of the amorphous polyester resin is preferably from 3,000 through 10,000, and more preferably from 4,000 through 7,000.

A number average molecular weight (Mn) of the amorphous polyester resin is preferably from 1,000 through 4,000, and more preferably from 1,500 through 3,000.

A molecular weight ratio (Mw/Mn) of the amorphous polyester resin is preferably from 1.0 through 4.0, and more preferably from 1.0 through 3.5. The molecular weight ratio (Mw/Mn) of the amorphous polyester resin is a ratio of the weight average molecular weight of the amorphous polyester resin to the number average molecular weight of the polyester resin.

The molecular weight can be measured by gel permeation chromatography (GPC).

The reasons why the above-described ranges of the molecular weight are preferable are as follows. When the molecular weight is too small, heat-resistant storage stability of a resulting toner and durability of the toner against stress, such as stirring inside a developing device, may be impaired. When the amount of a THF-soluble component having a molecular weight of 600 or less is too large, heat-resistant storage stability of a resulting toner and durability of the toner against stress, such as stirring inside a developing device, may be impaired. When the amount of the THF-soluble component having a molecular weight of 600 or less is too small, low-temperature fixability of a resulting toner may be impaired.

An amount of the THF-soluble component having a molecular weight of 600 or less is preferably 2% by mass or greater and 10% by mass or less.

Examples of a method of adjusting the amount of the THF-soluble component having a molecular weight of 600 or less include a method where the amorphous polyester resin is extracted with methanol, and the component having a molecular weight of 600 or less is removed from the extracted amorphous polyester resin to purify.

An acid value of the amorphous polyester resin is not particularly limited, and may be appropriately selected in accordance with the intended purpose. The acid value of the amorphous polyester resin is preferably from 1 mgKOH/g through 50 mgKOH/g, and more preferably from 5 mgKOH/g through 30 mgKOH/g. When the acid value of the amorphous polyester resin is 1 mgKOH/g or greater, a toner tends to be negatively charged, and affinity between paper and the toner increases during fixing the toner on the paper to thereby improve low-temperature fixability of the toner. When the acid value of the polyester resin component is 50 mgKOH/g or less, a problem associated with charging stability, particularly reduction in charging stability due to fluctuations of environmental conditions, can be minimized.

A hydroxyl value of the amorphous polyester resin is not particularly limited, and may be appropriately selected in accordance with the intended purpose. The hydroxyl value of the amorphous polyester resin is preferably 5 mgKOH/g or greater.

A glass transition temperature (Tg) of the amorphous polyester resin is not particularly limited, and may be appropriately selected in accordance with the intended purpose. The glass transition temperature (Tg) of the amorphous polyester resin is preferably 40° C. or higher and 65° C. or lower, more preferably 45° C. or higher and 65° C. or lower, and further more preferably 50° C. or higher and 60° C. or lower. When the Tg of the amorphous polyester resin is 40° C. or higher, heat-resistant storage stability of a resulting toner, and durability of the toner against stress, such as stirring inside a developing device, improve. When the Tg of the amorphous polyester resin is 65° C. or lower, a resulting toner desirably deforms upon application of heat and pressure during fixing, consequently improving low-temperature fixability of the toner.

An amount of the amorphous polyester resin is not particularly limited, and may be appropriately selected in accordance with the intended purpose. The amount of the amorphous polyester is preferably 80 parts by mass or greater and 90 parts by mass or less relative to 100 parts by mass of the toner.

—Crystalline Polyester Resin—

The crystalline polyester resin (may be also referred to as "crystalline polyester," or a "polyester resin component D") is not particularly limited, and may be appropriately selected in accordance with the intended purpose. Examples of the crystalline polyester resin include a crystalline polyester resin obtained through a reaction between a polyol and polycarboxylic acid.

The crystalline polyester resin has high crystallinity, thus the crystalline polyester resin has heat fusion characteristics such that viscosity of the crystalline polyester drastically changes at a temperature around a fixing onset temperature (e.g., a melt onset temperature).

Since the crystalline polyester resin having such properties is used in combination with the amorphous polyester resin, excellent heat-resistant storage stability is obtained at temperatures up to the melt onset temperature owing to the crystallinity of the crystalline polyester resin. At the melt onset temperature, drastic reduction in viscosity (sharp melt) is caused due to melting of the crystalline polyester resin, making the crystalline polyester resin compatible to the amorphous polyester resin. The above-described rapid reduction in the viscosity allows a resulting toner to be fixed. Therefore, the toner having both excellent heat-resistant storage stability and low temperature fixing ability can be provided. Moreover, a desired release range (a difference between the minimum fixing temperature and a hot-offset onset temperature) is also achieved.

The crystalline polyester resin is obtained with a multivalent alcohol (i.e., a polyol), and a multivalent carboxylic acid (e.g., a multivalent carboxylic acid, a multivalent carboxylic acid anhydride, and a multivalent carboxylic acid ester) or a derivative of the foregoing multivalent carboxylic acids.

In the present disclosure, the crystalline polyester resin means a resin obtained through a reaction between a multivalent alcohol, and a multivalent carboxylic acid. A modified polyester resin, such as the below-described prepolymer and a resin obtained through a cross-linking and/or elongation reaction of the prepolymer, is classified as a modified polyester resin, not the crystalline polyester resin.

——Multivalent Alcohol (Polyol)——

The multivalent alcohol (polyol) is not particularly limited, and may be appropriately selected in accordance with the intended purpose. Examples of the multivalent alcohol (polyol) include a diol and trivalent or higher polyol.

Examples of the diol include a saturated aliphatic diol.

Examples of the saturated aliphatic diol include a straight-chain saturated aliphatic diol, and a branched-chain saturated aliphatic diol. The above-listed examples may be used alone or in combination. Among the above-listed examples, a straight-chain saturated aliphatic diol is preferable, and a C2-C12 straight-chain saturated aliphatic diol is more preferable, because use of the straight-chain saturated aliphatic diol can improve crystallinity and lower a melting point.

When the saturated aliphatic diol has a branched-chain structure, crystallinity of a resulting crystalline polyester resin may be low, which may lead to a low melting point of the crystalline polyester resin. When the number of carbon atoms in the saturated aliphatic diol is greater than 12, materials that can be used in practice may not be readily available. Therefore, the number of carbon atoms is more preferably 12 or less.

Examples of the saturated aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanediol.

Among the above-listed examples, ethylene glycol, 1,4-butanediol, 1,6-hexanediol, 1,8-octanediol, 1,10-decanediol, and 1,12-dodecanediol are preferable because a resulting crystalline polyester resin has high crystallinity and excellent sharp melting properties.

Examples of the trivalent or higher alcohol include glycerin, trimethylolethane, trimethylolpropane, and pentaerythritol.

——Multivalent Carboxylic Acid (Polycarboxylic Acid)——

The multivalent carboxylic acid (i.e., polycarboxylic acid) is not particularly limited, and may be appropriately selected in accordance with the intended purpose. Examples of the polycarboxylic acid include a divalent carboxylic acid, and a trivalent or higher carboxylic acid.

Examples of the divalent carboxylic acid include: a saturated aliphatic dicarboxylic acid, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acid, such as dibasic acid (e.g., phthalic acid, isophthalic acid, terephthalic acid, and naphthalene-2,6-dicarboxylic acid); malonic acid, and mesaconic acid; anhydrides of the foregoing carboxylic acids; and lower (C1-C3) alkyl esters of the foregoing carboxylic acids.

Examples of the trivalent or higher carboxylic acid include 1,2,4-benzenetricarboxylic acid, 1,2,5-benzenetricarboxylic acid, 1,2,4-naphthalenetricarboxylic acid, anhydrides of the foregoing carboxylic acids, and lower (C1-C3) alkyl esters of the foregoing carboxylic acids.

In addition to the saturated aliphatic dicarboxylic acid or aromatic dicarboxylic acid, moreover, dicarboxylic acid having a sulfonic acid group may be included as the polycarboxylic acid. In addition to the saturated aliphatic dicarboxylic acid or aromatic dicarboxylic acid, furthermore, a dicarboxylic acid having a double bond may be included.

The above-listed examples may be used alone or in combination.

The crystalline polyester resin is preferably formed from a C4-C12 straight-chain saturated aliphatic dicarboxylic acid and a C2-C12 straight-chain saturated aliphatic diol. Specifically, the crystalline polyester resin preferably includes a constituent unit derived from a C4-C12 saturated aliphatic dicarboxylic acid and a constituent unit derived from a C2-C12 saturated aliphatic diol. Such a crystalline polyester resin is preferable because excellent sharp melting properties can be imparted to a resulting toner to exhibit excellent low-temperature fixability.

The crystallinity of the crystalline polyester resin can be confirmed by means of a crystallography X-ray diffractometer (e.g., X'Pert Pro MRD, available from Philips). A method of determining the crystallinity will be described hereinafter.

First, a sample is ground by a mortar and pestle to prepare sample powder. The obtained sample powder is uniformly deposited in a sample holder. Thereafter, the sample holder is set in the diffractometer, and the sample is measured to obtain a diffraction spectrum.

When a peak half value width of a peak having the maximum peak intensity among peaks in the range of $20° < 2\theta < 25°$ is 2.0 or less, the sample is determined as having crystallinity.

In contrast to the crystalline polyester resin, the polyester resin that does not exhibit the above-described state is referred to as an amorphous polyester resin in the present specification.

The measuring conditions of the X-ray diffraction spectroscopy are as follows.

[Measuring Conditions]
Tension kV: 45 kV
Current: 40 mA
MPSS
Upper
Gonio
Scan mode: continuous
Start angle: 3°
End angle: 35°
Angle Step: 0.02°
Incident beam optics
Divergence slit: Div slit 1/2
Deflection beam optics
Anti-scatter slit: As Fixed 1/2
Receiving slit: Prog rec slit A melting point of the crystalline polyester resin is not particularly limited, and may be appropriately selected in accordance with the intended purpose. The melting point of the crystalline polyester resin is preferably 60° C. or higher and 80° C. or lower. When the melting point of the crystalline polyester resin is 60° C. or higher, the crystalline polyester resin easily melts at a low temperature, leading to excellent storage stability of a resulting toner. When the melting point of the crystalline polyester resin is 80° C. or lower, the crystalline polyester resin adequately melts with heat applied during fixing, leading to excellent low-temperature fixability of a resulting toner.

A molecular weight of the crystalline polyester resin is not particularly limited, and may be appropriately selected in accordance with the intended purpose.

The weight average molecular weight (Mw) of the orthodichlorobenzene-soluble component of the crystalline polyester resin as measured by GPC is preferably from 3,000 through 30,000, and more preferably from 5,000 through 15,000.

The number average molecular weight (Mn) of the orthodichlorobenzene-soluble component of the crystalline polyester resin as measured by GPC is preferably from 1,000 through 10,000, and more preferably from 2,000 through 10,000.

A ratio Mw/Mn of the molecular weights of the crystalline polyester resin is preferably from 1.0 through 10, and more preferably from 1.0 through 5.0.

The above-described ranges of the molecular weights of the crystalline polyester resin are preferable because a sharp molecular-weight distribution of the crystalline polyester resin imparts excellent low-temperature fixability to a resulting toner, whereas a large amount of a low molecular-weight component may impair heat-resistant storage stability of the toner.

An acid value of the crystalline polyester resin is not particularly limited, and may be appropriately selected in accordance with the intended purpose. The acid value of the crystalline polyester resin is preferably 5 mgKOH/g or greater and 45 mgKOH/g or less, and more preferably 10 mgKOH/g or greater and 45 mgKOH/g or less. When the acid value is 5 mgKOH/g or greater, excellent low-temperature fixability is assured. When the acid value is 45 mgKOH/g or less, excellent hot-offset resistance is assured.

A hydroxyl value of the crystalline polyester resin is not particularly limited, and may be appropriately selected in accordance with the intended purpose. The hydroxyl value of the crystalline polyester resin is preferably 0 mgKOH/g or greater and 50 mgKOH/g or less, and more preferably 5 mgKOH/g or greater and 50 mgKOH/g or less, because excellent low-temperature fixability and excellent charging properties are assured.

A molecular structure of the crystalline polyester resin can be confirmed by solution or solid NMR spectroscopy, X-ray diffraction spectroscopy, GC/MS, LC/MS, or IR spectroscopy. As a simple method of confirming the molecule structure of the crystalline polyester resin, there is a method where a compound having absorption, which is based on δCH (out of plane bending) of an olefin, at $965 \pm 10\ cm^{-1}$ or $990 \pm 10\ cm^{-1}$ in an infrared absorption spectrum of the compound is detected as a crystalline polyester resin.

An amount of the crystalline polyester resin is not particularly limited, and may be appropriately selected in accordance with the intended purpose. The amount of the crystalline polyester resin is 3 parts by mass or greater and 20 parts by mass or less, and more preferably 5 parts by mass or greater and 15 parts by mass or less, relative to 100 parts by mass of the toner. When the amount of the crystalline polyester resin is 3 parts by mass or greater, sharp melting properties of the crystalline polyester resin are adequately exhibited, consequently assuring excellent low-temperature fixability of a resulting toner. When the amount of the crystalline polyester resin is 20 parts by mass or less, excellent heat-resistant storage stability of a resulting toner is assured and occurrence of image fogging can be minimized.

The multivalent alcohol component is not particularly limited, and may be appropriately selected in accordance with the intended purpose. Examples of the multivalent alcohol component include: a bisphenol A C2-C3 alkylene oxide adduct (the average number of moles added: from 1 through 10), such as polyoxypropylene(2.2)-2,2-bis(4-hydroxyphenyl)propane and polyoxyethylene(2.2)-2,2-bis(4-hydroxyphenyl)propane; ethylene glycol; propylene glycol; neopentyl glycol; glycerin; pentaerythritol; trimethylolpropane; hydrogenated bisphenol A; sorbitol; and C2-C3 alkylene oxide adducts (the average number of moles added: from 1 through 10) of the foregoing alcohol components. The above-listed examples may be used alone or in combination.

The multivalent carboxylic acid component is not particularly limited, and may be appropriately selected in accordance with the intended purpose. Examples of the multivalent carboxylic acid component include: a dicarboxylic acid, such as adipic acid, phthalic acid, isophthalic acid, terephthalic acid, fumaric acid, and maleic acid; succinic acid substituted with a C1-C20 alkyl group or a C2-C20 alkenyl group, such as dodecenyl succinic acid, and octyl succinic acid; trimellitic acid; pyromellitic acid; anhydrides of the foregoing acid components; and C1-C8 alkyl esters of the foregoing acid components. The above-listed examples may be used alone or in combination.

At least part of the amorphous polyester resin is preferably compatible with the below-described prepolymer, or a resin obtained through a crosslinking reaction and/or an elongation reaction of the prepolymer. Since at least part of the amorphous polyester resin is compatible with the prepolymer or the polymer, low-temperature fixability and hot offset resistance of a resulting toner improve.

The weight average molecular weight (Mw) of the amorphous polyester resin is not particularly limited, and may be appropriately selected in accordance with the intended purpose. The weight average molecular weight (Mw) of the amorphous polyester resin is preferably from 2,500 through 10,000.

The number average molecular weight (Mn) of the amorphous polyester resin is not particularly limited, and may be appropriately selected in accordance with the intended purpose. The number average molecular weight (Mn) of the amorphous polyester resin is preferably from 1,000 through 4,000.

The ratio Mw/Mn is not particularly limited, and may be appropriately selected in accordance with the intended purpose. The ratio Mw/Mn is preferably 1.0 or greater and 4.0 or less.

A measuring method of the weight average molecular weight (Mw) and the number average molecular weight (Mn) is not particularly limited, and may be appropriately selected in accordance with the intended purpose. For example, the weight average molecular weight (Mw) and the number average molecular weight (Mn) can be measured by gel permeation chromatography (GPC).

An acid value of the amorphous polyester resin is not particularly limited, and may be appropriately selected in accordance with the intended purpose. The acid value of the amorphous polyester resin is preferably 1 mgKOH/g or greater and 50 mgKOH/g or less, and more preferably 5 mgKOH/g or greater and 30 mgKOH/g or less. When the acid value of the amorphous polyester resin is 1 mgKOH/g or greater, a resulting toner is likely to be negatively charged to give the toner desirable affinity to a recording medium, such as paper, consequently improving low-temperature fixability. When the acid value of the amorphous polyester resin is 50 mgKOH/g or less, a resulting toner has excellent charging stability against fluctuations of the environmental conditions.

A hydroxyl value of the amorphous polyester resin is not particularly limited, and may be appropriately selected in accordance with the intended purpose. The hydroxyl value of the amorphous polyester resin is preferably 5 mgKOH/g or greater.

A glass transition temperature (Tg) of the amorphous polyester resin is not particularly limited, and may be appropriately selected in accordance with the intended purpose. When the Tg is too low, heat-resistant storage stability of a resulting toner and durability of the toner against stress, such as stirring inside a developing device, may be impaired. When the Tg is too high, viscoelasticity of a resulting toner is high as the toner is melted, thus the toner may have inadequate low-temperature fixability. For the reasons as described, the Tg of the amorphous polyester resin is preferably from 40° C. through 70° C., and more preferably from 45° C. through 60° C.

An amount of the amorphous polyester resin is not particularly limited, and may be appropriately selected in accordance with the intended purpose. The amount of the amorphous polyester resin relative to the toner is preferably 50% by mass or greater and 95% by mass or less, and more preferably 60% by mass or greater and 90% by mass or less. When the amount of the amorphous polyester resin is 50% by mass or greater, constituent components of a toner, such as a pigment, and a release agent, are homogeneously dispersed within each toner base particle, leading to formation of a high-quality image. When the amount of the amorphous resin is 95% by mass or less, excellent low-temperature fixability is imparted to a resulting toner.

A molecular structure of the amorphous polyester resin can be confirmed by solution or solid NMR spectroscopy, X-ray diffraction spectroscopy, GC/MS, LC/MS, or IR spectroscopy. As a simple method of confirming the molecular structure of the amorphous polyester resin, there is a method where a compound having no absorption, which is based on δCH (out of plane bending) of an olefin, at 965±10 $cm^{-1}$ or 990±10 $cm^{-1}$ in an infrared absorption spectrum is detected as an amorphous polyester resin.

<<Release Agent>>

The release agent is not particularly limited, and may be appropriately selected from release agents known in the art.

The release agent may be a wax-based release agent. Examples of the wax-based release agent include natural wax, such as vegetable wax (e.g., carnauba wax, cotton wax, Japanese wax, and rice wax), animal wax (e.g., bees wax and lanolin wax), mineral wax (e.g., ozocerite and ceresin), and petroleum wax (e.g., paraffin wax, microcrystalline wax, and petrolatum wax).

A melting point of the release agent is not particularly limited, and may be appropriately selected in accordance with the intended purpose. The melting point of the release agent is preferably 60° C. or higher and lower than 95° C.

The release agent is more preferably hydrocarbon wax having a melting point of 60° C. or higher and lower than 95° C. Such a release agent effectively acts as a release agent at an interface between a fixing roller and the toner, thus hot offset resistance is improved without applying a release agent (e.g., oil) onto the fixing roller.

Particularly, hydrocarbon-based wax is preferable because the hydrocarbon-based wax is not very compatible with the polyester resin A and the hydrocarbon-based wax and the polyester resin A each independently function so that a softening effect of the crystalline polyester resin as a binder resin and offset resistance owing to the release agent are both assured.

When the melting point of the release agent is lower than 60° C., the release agent tends to melt at a low temperature, thus heat-resistant storage stability of a resulting toner may be inadequate. When the melting point of the release agent is 95° C. or higher, the release agent may not be sufficiently melted by heat applied during fixing and thus adequate offset resistance may not be achieved.

An amount of the release agent is not particularly limited, and may be appropriately selected in accordance with the intended purpose. The amount of the release agent is preferably from 2 parts by mass through 10 parts by mass, and more preferably 3 parts by mass through 8 parts by mass, relative to 100 parts by mass of the toner. When the amount of the release agent is less than 2 parts by mass, hot offset resistance of a resulting toner during fixing and low-temperature fixability of the toner may be impaired. When the amount of the release agent is greater than 10 parts by mass, heat-resistant storage stability of a resulting toner may be impaired, and image fogging may occur. When the amount of the release agent is within the above-mentioned more preferable range, higher image quality can be achieved, and fixing stability of a resulting toner improves.

<<Colorant>>

The colorant is not particularly limited, and may be appropriately selected in accordance with the intended purpose. Examples of the colorant include carbon black, a nigrosine dye, iron black, naphthol yellow S, Hansa yellow (10G, 5G, G), cadmium yellow, yellow iron oxide, yellow ocher, yellow lead, titanium yellow, polyazo yellow, oil yellow, Hansa yellow (GR, A, RN, R), pigment yellow L, benzidine yellow (G, GR), permanent yellow (NCG), Vulcan fast yellow (5G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, para-red, fiser red, parachloroorthonitro aniline red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red FSR, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, and lithopone.

An amount of the colorant is not particularly limited, and may be appropriately selected in accordance with the intended purpose. The amount of the colorant is preferably from 1 part by mass through 15 parts by mass, and more preferably from 3 parts by mass through 10 parts by mass, relative to 100 parts by mass of the toner.

The colorant may be also used as a master batch in which the colorant forms a composite with a resin. Examples of the resin used for production of the master batch, or the resin kneaded together with the master batch include, in addition to the above-mentioned hybrid resin, polymers of styrene or substituted styrene [e.g., polystyrene, poly(p-chlorostyrene), and polyvinyl toluene], styrene-based copolymers (e.g., a styrene-p-chlorostyrene copolymer, a styrene-propylene copolymer, a styrene-vinyl toluene copolymer, a styrene-vinyl naphthalene copolymer, a styrene-methyl acrylate copolymer, a styrene-ethyl acrylate copolymer, a styrene-butyl acrylate copolymer, a styrene-octyl acrylate copolymer, a styrene-methyl methacrylate copolymer, a styrene-ethyl methacrylate copolymer, a styrene-butyl methacrylate copolymer, a styrene-methyl α-chloromethacrylate copolymer, a styrene-acrylonitrile copolymer, a styrene-methyl vinyl ketone copolymer, a styrene-butadiene copolymer, a styrene-isoprene copolymer, a styrene-acrylonitrile-indene copolymer, a styrene-maleic acid copolymer, and a styrene-maleic acid ester copolymer), polymethyl methacrylate, polybutyl methacrylate, polyvinyl chloride, polyvinyl acetate, polyethylene, polypropylene, polyester, an epoxy resin, an epoxypolyol resin, polyurethane, polyamide, polyvinyl butyral, a polyacrylic resin, rosin, modified rosin, a terpene resin, an aliphatic or alicyclic hydrocarbon resin, an aromatic petroleum resin, chlorinated paraffin, and paraffin wax. The above-listed examples may be used alone or in combination.

The master batch can be prepared by applying high shear force to a resin and colorant used for a master batch to mix and knead the mixture. In order to enhance the interaction between the colorant and the resin, an organic solvent may be used. Moreover, a flashing method is preferably used, since a wet cake of the colorant can be directly used without being dried. The flashing method is a method where an aqueous paste containing a colorant is mixed or kneaded with a resin and an organic solvent, and then the colorant is transferred into the resin, followed by removing the moisture and the organic solvent. A high-shearing disperser (e.g., a three-roll mill) is preferably used for the mixing and kneading.

<<Inorganic Filler>>

Each of the toner base particles may further include inorganic filler.

The inorganic filler is not particularly limited, and may be appropriately selected in accordance with the intended purpose. Examples of the inorganic filler include calcium carbonate, kaolin clay, talc, barium sulfate, and a layered inorganic mineral. The above-listed examples may be used alone or in combination.

The inorganic filler may be processed through a surface treatment using a silane coupling agent, a surfactant, or metal soap. The inorganic filler may be classified so that the inorganic filler has a desired particle size distribution.

The layered inorganic mineral is an inorganic mineral in which layers each having a nanoscale thickness are laminated. The layered inorganic mineral is preferably a modified-layered inorganic mineral that is modified with organic ions. The modifying with organic ions means that organic ions are introduced to ions present between layers of the layered inorganic mineral. The modified-layered inorganic mineral has high hydrophilicity due to the modified layered structure of the inorganic mineral. Therefore, the modified layered inorganic mineral is finely dispersed into irregular-shaped granules and is predominantly located at surfaces of toner base particles during production of a toner. Thus, the modified-layered inorganic mineral imparts a charge controlling function to a resulting toner, as well as excellent low-temperature fixability.

Examples of the layered inorganic mineral include smectite (e.g., montmorillonite, and saponite), kaolin (e.g., kaolinite), and magadiite, kanemite.

An amount of the layered inorganic mineral in a total amount of the constituent components of the toner base particles (may be also referred to as "toner materials") is preferably from 0.2% by mass through 1.5% by mass.

<<Other Components>>

Other components included in the toner base particles are not particularly limited, and may be appropriately selected in accordance with the intended purpose. Examples of the above-mentioned components include a prepolymer, an active hydrogen group-containing compound, a charge-controlling agent, a flowability improver, and a magnetic material.

The prepolymer is a polymer having a site reactive with an active hydrogen group-containing compound. The prepolymer is not particularly limited, and may be appropriately selected in accordance with the intended purpose. Examples of the prepolymer include a polyol resin, a polyacrylic resin, a polyester resin, an epoxy resin, and derivatives of the foregoing polymers. The above-listed examples may be used alone or in combination. Among the above-listed examples, a polyester resin is preferable considering high flowability as a resulting toner is melted, and transparency.

Examples of the site of the prepolymer reactive with the active hydrogen group-containing compound include an isocyanate group, an epoxy group, a carboxyl group, and a functional group represented by —COCl. The above-listed examples may be used alone or in combination. Among the above-listed examples, an isocyanate group is preferable.

The prepolymer is not particularly limited, and may be appropriately selected in accordance with the intended purpose. The prepolymer is preferably a polyester resin including an isocyanate group that can generate a urea bond because a molecular weight of a resulting polymer component is easily adjusted, and excellent release properties and fixability are assured with oil-less low-temperature fixing using a dry toner, particularly even in a case where a release-oil application system for applying release oil to a heating member used for fixing is absent.

The active hydrogen group-containing compound acts as an elongation agent or a crosslinking agent during an elongation reaction or a cross-linking reaction of the prepolymer performed in an aqueous medium.

The active hydrogen group is not particularly limited, and may be appropriately selected in accordance with the intended purpose. Examples of the active hydrogen group include a hydroxyl group (e.g., an alcoholic hydroxyl group, and a phenolic hydroxyl group), an amino group, a carboxyl group, and a mercapto group. The above-listed examples may be used alone or in combination.

The active hydrogen group-containing compound is not particularly limited, and may be appropriately selected in accordance with the intended purpose. When the prepolymer is an isocyanate group-containing polyester resin, the active hydrogen group-containing compound is preferably selected from amines.

The amines are not particularly limited, and may be appropriately selected in accordance with the intended purpose. Examples of the amines include a diamine, a trivalent or higher amine, an amino alcohol, an amino mercaptan, an amino acid, and any of the foregoing amines in which an amino group is blocked. The above-listed examples may be used alone or in combination. Among the above-listed examples, a diamine and a trivalent or higher amine are preferable.

Examples of the diamine are not particularly limited, and may be appropriately selected in accordance with the intended purpose. Examples of the diamine include an aromatic diamine, an alicyclic diamine, and an aliphatic diamine.

The aromatic diamine is not particularly limited, and may be appropriately selected in accordance with the intended purpose. Examples of the aromatic diamine include phenylene diamine, diethyltoluene diamine, and 4,4'-diaminodiphenylmethane.

The alicyclic diamine is not particularly limited, and may be appropriately selected in accordance with the intended purpose. Examples of the alicyclic diamine include 4,4'-diamino-3,3'-dimethyldicyclohexylmethane, diaminocyclohexane, and isophorone diamine.

The aliphatic diamine is not particularly limited, and may be appropriately selected in accordance with the intended purpose. Examples of the aliphatic diamine include ethylene diamine, tetramethylene diamine, and hexamethylene diamine.

The trivalent or higher amine is not particularly limited, and may be appropriately selected in accordance with the intended purpose. Examples of the trivalent or higher amine include diethylene triamine, and triethylene tetramine.

The amino alcohol is not particularly limited, and may be appropriately selected in accordance with the intended purpose. Examples of the amino alcohol include ethanol amine, and hydroxyethylaniline.

The amino mercaptan is not particularly limited, and may be appropriately selected in accordance with the intended purpose. Examples of the amino mercaptan include aminoethyl mercaptan, and aminopropyl mercaptan.

The amino acid is not particularly limited, and may be appropriately selected in accordance with the intended purpose. Examples of the amino acid include amino propionic acid, and amino caproic acid.

The amine in which an amino group is blocked is not particularly limited, and may be appropriately selected in accordance with the intended purpose. Examples of the amine in which an amino group is blocked include ketimine compounds and oxazoline compounds obtained by blocking an amino group with any of ketones, such as acetone, methyl ethyl ketone, and methyl isobutyl ketone.

The isocyanate group-containing polyester resin (may be referred to as a "isocyanate group-containing polyester prepolymer") is not particularly limited, and may be appropriately selected in accordance with the intended purpose. Examples of the isocyanate group-containing polyester resin include a reaction product between an active hydrogen group-containing polyester and a polyisocyanate, where the active hydrogen group-containing polyester is obtained through polycondensation between a polyol and a polycarboxylic acid.

The polyol is not particularly limited, and may be appropriately selected in accordance with the intended purpose.

Examples of the polyol include a diol, a trivalent or higher alcohol, and a mixture of a diol and a trivalent or higher alcohol. The above-listed examples may be used alone or in combination.

Among the above-listed examples, a diol, and a mixture including a diol and a small amount of a trivalent or higher alcohol are preferable.

The diol is not particularly limited, and may be appropriately selected in accordance with the intended purpose. Examples of the diol include: an alkylene glycol, such as ethylene glycol, 1,2-propyleneglycol, 1,3-propyleneglycol, 1,4-butanediol, and 1,6-hexanediol; an oxyalkylene group-containing diol, such as diethylene glycol, triethylene glycol, dipropylene glycol, polyethylene glycol, polypropylene glycol, and polytetramethylene glycol; an alicyclic diol, such as 1,4-cyclohexanedimethanol, and hydrogenated bisphenol A; an alkylene oxide (e.g., ethylene oxide, propylene oxide, and butylene oxide) adduct of alicyclic diol; bisphenols, such as bisphenol A, bisphenol F, and bisphenol S; and a bisphenol alkylene oxide adduct, such as an alkylene oxide (e.g., ethylene oxide, propylene oxide, and butylene oxide) of bisphenol. The number of carbon atoms in the alkylene glycol is not particularly limited, and may be appropriately selected in accordance with the intended purpose. The number of carbon atoms is preferably from 2 through 12. Among the above-listed examples, a C2-C12 alkylene glycol, and a bisphenol alkylene oxide adduct are preferable, and a bisphenol alkylene oxide adduct, and a mixture of a bisphenol alkylene oxide adduct and a C2-C12 alkylene glycol are more preferable.

The trivalent or higher alcohol is not particularly limited, and may be appropriately selected in accordance with the intended purpose. Examples of the trivalent or higher alcohol include a trivalent or higher aliphatic alcohol, trivalent or higher polyphenols, and a trivalent or higher polyphenol alkylene oxide adduct.

The trivalent or higher aliphatic alcohol is not particularly limited, and may be appropriately selected in accordance with the intended purpose. Examples of the trivalent or higher aliphatic alcohol include glycerin, trimethylol ethane, trimethylolpropane, pentaerythritol, and sorbitol.

The trivalent or higher polyphenols are not particularly limited, and may be appropriately selected in accordance with the intended purpose. Examples of the trivalent or higher polyphenols include trisphenol PA, phenol novolac, and cresol novolac.

Examples of the trivalent or higher polyphenol alkylene oxide adduct include alkylene oxide (e.g., ethylene oxide, propylene oxide, and butylene oxide) adducts of trivalent or higher polyphenols.

When the diol and the trivalent or higher alcohol are used as a mixture, a mass ratio of the trivalent or higher alcohol to the diol is not particularly limited, and may be appropriately selected in accordance with the intended purpose. The mass ratio is preferably from 0.01% by mass through 10% by mass, and more preferably from 0.01% by mass through 1% by mass.

The polycarboxylic acid is not particularly limited, and may be appropriately selected in accordance with the intended purpose. Examples of the polycarboxylic acid include a dicarboxylic acid, a trivalent or higher carboxylic acid, and a mixture of a dicarboxylic acid and a trivalent or higher carboxylic acid. The above-listed examples may be used alone or in combination.

Among the above-listed examples, a dicarboxylic acid, and a mixture including a dicarboxylic acid and a small amount of a trivalent or higher carboxylic acid are preferable.

The dicarboxylic acid is not particularly limited, and may be appropriately selected in accordance with the intended purpose. Examples of the dicarboxylic acid include a divalent alkanoic acid, a divalent alkenoic acid, and an aromatic dicarboxylic acid.

The divalent alkanoic acid is not particularly limited, and may be appropriately selected in accordance with the intended purpose. Examples of the divalent alkanoic acid include succinic acid, adipic acid, and sebacic acid.

The divalent alkenoic acid is not particularly limited, and may be appropriately selected in accordance with the intended purpose. The divalent alkenoic acid is preferably a C4-C20 divalent alkenoic acid. The C4-C20 divalent alkenoic acid is not particularly limited, and may be appropriately selected in accordance with the intended purpose. Examples of the C4-C20 divalent alkenoic acid include maleic acid, and fumaric acid.

Examples of the aromatic dicarboxylic acid are not particularly limited, and may be appropriately selected in accordance with the intended purpose. The aromatic dicarboxylic acid is preferably a C8-C20 aromatic dicarboxylic acid. The C8-C20 aromatic dicarboxylic acid is not particularly limited, and may be appropriately selected in accordance with the intended purpose. Examples of the C8-C20 aromatic dicarboxylic acid include phthalic acid, isophthalic acid, terephthalic acid, and naphthalene dicarboxylic acid.

The trivalent or higher carboxylic acid is not particularly limited, and may be appropriately selected in accordance with the intended purpose. Examples of the trivalent or higher carboxylic acid include a trivalent or higher aromatic carboxylic acid.

The trivalent or higher aromatic carboxylic acid is not particularly limited, and may be appropriately selected in accordance with the intended purpose. The trivalent or higher aromatic carboxylic acid is preferably a C9-C20 trivalent or higher aromatic carboxylic acid. The C9-C20 trivalent or higher aromatic carboxylic acid is not particularly limited, and may be appropriately selected in accordance with the intended purpose. Examples of the C9-C20 trivalent or higher aromatic carboxylic acid include trimellitic acid, and pyromellitic acid.

As the polycarboxylic acid, an acid anhydride or lower alkyl ester of any of a dicarboxylic acid, a trivalent or higher carboxylic acid, or a mixture including a dicarboxylic acid and a trivalent or higher carboxylic acid may be used.

The lower alkyl ester is not particularly limited, and may be appropriately selected in accordance with the intended purpose. Examples of the lower alkyl ester include a methyl ester, an ethyl ester, and an isopropyl ester.

When the dicarboxylic acid and the trivalent or higher carboxylic acid are used as a mixture, a mass ratio of the trivalent or higher carboxylic acid to the dicarboxylic acid is not particularly limited, and may be appropriately selected in accordance with the intended purpose. The mass ratio is preferably from 0.01% by mass through 10% by mass, and more preferably from 0.01% by mass through 1% by mass.

When the polyol and the polycarboxylic acid are reacted through polycondensation, an equivalent ratio of a hydroxyl group of the polyol to a carboxyl group of the polycarboxylic acid is not particularly limited, and may be appropriately selected in accordance with the intended purpose. The equivalent ratio is preferably from 1 through 2, more preferably from 1 through 1.5, and particularly preferably from 1.02 through 1.3.

An amount of the constituent unit derived from the polyol in the isocyanate group-containing polyester prepolymer is not particularly limited, and may be appropriately selected in accordance with the intended purpose. The amount of the constituent unit is preferably from 0.5% by mass through 40% by mass, more preferably from 1% by mass through 30% by mass, and particularly preferably from 2% by mass through 20% by mass.

When the amount of the constituent unit is less than 0.5% by mass, hot offset resistance of a resulting toner may be impaired, and it may be difficult to achieve both heat-resistant storage stability and low-temperature fixability of the toner. When the amount of the constituent unit is greater than 40% by mass, low-temperature fixability of a resulting toner may be impaired.

The polyisocyanate is not particularly limited, and may be appropriately selected in accordance with the intended purpose. Examples of the polyisocyanate include an aliphatic diisocyanate, an alicyclic diisocyanate, an aromatic diisocyanate, an aromatic aliphatic diisocyanate, isocyanurate, and products obtained by blocking the above-listed polyisocyanates with a phenol derivative, oxime, or caprolactam.

The aliphatic diisocyanate is not particularly limited, and may be appropriately selected in accordance with the intended purpose. Examples of the aliphatic diisocyanate include tetramethylene diisocyanate, hexamethylene diisocyanate, 2,6-diisocyanatocaproic acid methyl ester, octamethylene diisocyanate, decamethylene diisocyanate, dodecamethylene diisocyanate, tetradecamethylene diisocyanate, trimethylhexane diisocyanate, and tetramethylhexane diisocyanate.

The alicyclic diisocyanate is not particularly limited, and may be appropriately selected in accordance with the intended purpose. Examples of the alicyclic diisocyanate include isophorone diisocyanate, and cyclohexylmethane diisocyanate.

The aromatic diisocyanate is not particularly limited, and may be appropriately selected in accordance with the intended purpose. Examples of the aromatic diisocyanate include tolylene diisocyanate, diisocyanatodiphenyl methane, 1,5-naphthylenediisocyanate, 4,4'-diisocyanatodiphenyl, 4,4'-diisocyanato-3,3'-dimethyldiphenyl, 4,4'-diisocyanato methyldiphenylmethane, and 4,4'-diisocyanato-diphenyl ether.

The aromatic aliphatic diisocyanate is not particularly limited, and may be appropriately selected in accordance with the intended purpose. Examples of the aromatic aliphatic diisocyanate include α,α,α',α'-tetramethylxylenediisocyanate.

The isocyanurate is not particularly limited, and may be appropriately selected in accordance with the intended purpose. Examples of the isocyanurate include tris(isocyanatoalkyl)isocyanurate, and tris(isocyanatocycloalkyl)isocyanurate. The above-listed examples may be used alone or in combination.

When the polyisocyanate reacts with the polyester resin including a hydroxyl group, an equivalent ratio (NCO/OH) of an isocyanate group of the polyisocyanate to a hydroxyl group of the polyester resin is not particularly limited, and may be appropriately selected in accordance with the intended purpose. The equivalent ratio (NCO/OH) is preferably from 1 through 5, more preferably from 1.2 through 4, and particularly preferably from 1.5 through 3. When the equivalent ratio (NCO/OH) is less than 1, hot offset resistance of a resulting toner may be impaired. When the equivalent ratio (NCO/OH) is greater than 5, low-temperature fixability of a resulting toner may be impaired.

An amount of the constituent unit derived from polyisocyanate in the isocyanate group-containing polyester prepolymer is not particularly limited, and may be appropriately selected in accordance with the intended purpose. The amount of the constituent unit is preferably from 0.5% by mass through 40% by mass, more preferably from 1% by mass through 30% by mass, and particularly preferably from 2% by mass through 20% by mass. When the amount of the constituent unit is less than 0.5% by mass, hot offset resistance of a resulting toner may be impaired. When the amount of the constituent unit is greater than 40% by mass, low-temperature fixability of a resulting toner may be impaired.

The average number of isocyanate groups per molecule of the isocyanate group-containing polyester prepolymer is not particularly limited, and may be appropriately selected in accordance with the intended purpose. The average number of isocyanate groups is preferably 1 or greater, more preferably from 1.2 through 5, and particularly preferably from 1.5 through 4. When the average number of isocyanate groups is less than 1, a molecular weight of a resulting modified polyester resin is small, and the small molecular weight of the modified polyester resin may lead to inadequate hot offset resistance of a resulting toner.

A mass ratio of the isocyanate group-containing polyester prepolymer to the above-described polyester resin is not particularly limited, and may be appropriately selected in accordance with the intended purpose. The polyester resin includes 50 mol % or greater of a polypropylene oxide adduct of bisphenol in the multivalent alcohol component, and has the certain hydroxyl value and acid value. The mass ratio is preferably from 5/95 through 25/75, and more preferably from 10/90 through 25/75. When the mass ratio is less than 5/95, hot offset resistance may be impaired. When the mass ratio is greater than 25/75, low-temperature fixability or glossiness of an image may be impaired.

The charge-controlling agent is not particularly limited, and may be appropriately selected in accordance with the intended purpose. Examples of the charge-controlling agent include a nigrosine-based dye, a triphenylmethane-based dye, a chrome-containing metal complex dye, a molybdic acid chelate pigment, a rhodamine-based dye, an alkoxy-based amine, a quaternary ammonium salt (including fluorine-modified quaternary ammonium), an alkylamide, phosphorus or a phosphorus compound, tungsten or a tungsten compound, a fluorosurfactant, a metal salt of salicylic acid, and a metal salt of a salicylic acid derivative. Specific examples of the charge-controlling agent include: nigrosine dye BONTRON 03, quaternary ammonium salt BONTRON P-51, metal-containing azo dye BONTRON S-34, oxynaphthoic acid-based metal complex E-82, salicylic acid-based metal complex E-84, and phenol condensate E-89 (all manufactured by ORIENT CHEMICAL INDUSTRIES CO., LTD); quaternary ammonium salt molybdenum complex TP-302 and TP-415 (all manufactured by Hodogaya Chemical Co., Ltd.); LRA-901, and boron complex LR-147 (manufactured by Japan Carlit Co., Ltd.); copper phthalocyanine; perylene; quinacridone; an azo pigment; and a polymer compound including a functional group, such as a sulfonic acid group, a carboxyl group, and a quaternary ammonium salt.

An amount of the charge-controlling agent is not particularly limited, and may be appropriately selected in accordance with the intended purpose. The amount of the charge-controlling agent is preferably from 0.1 parts by mass through 10 parts by mass, and more preferably from 0.2 parts by mass through 5 parts by mass relative to 100 parts by mass of the toner. When the amount of the charge-controlling agent is greater than 10 parts by mass, excessive chargeability may be imparted to a resulting toner, and the excessive chargeability may impair a main effect as the charge-controlling agent. As a result, the electrostatic attraction force between the toner and the developing roller increases, which lowers flowability of a developer or reduces image density of an image formed with the toner. The charge-controlling agent may be melt-kneaded with a master batch or resin, followed by dissolving or dispersing the charge-controlling agent in the master batch or the resin, or may be directly added to an organic solvent when the master batch or resin is dissolved or dispersed in the organic solvent. Alternatively, the charge-controlling agent may be fixed on surfaces of toner base particles after producing the toner base particles.

<Other Components>

Other components included in the toner are not particularly limited, and may be appropriately selected in accordance with the intended purpose. Examples of such components include external additives, other than the zinc stearate particles.

<<Other External Additives>>

Examples of the above-mentioned other external additives include: particles of fatty acid (e.g., stearic acid) metal salts, such as calcium stearate, and aluminium stearate; titania particles; titanium oxide particles; alumina particles; and polymer particles produced by soap-free emulsion polymerization, such as polymethyl methacrylate particles, and polystyrene particles.

As the titania particles, a commercial product may be used. Examples of the commercial product of the titania particles include: P-25 available from NIPPON AEROSIL CO., LTD.; STT-30, and STT-65C-S, available from Titan Kogyo, Ltd.; TAF-140 available from Fuji Titanium Industry Co., Ltd.; and MT-150W, MT-500B, MT-600B, and MT-150A, available from TAYCA CORPORATION.

Examples of the hydrophobicity-treated titanium oxide particles include: T-805, available from NIPPON AEROSIL CO., LTD.; STT-30A and STT-65S-S, available from Titan Kogyo, Ltd.; TAF-500T and TAF-1500T, available from Fuji Titanium Industry Co., Ltd.; MT-100S and MT-100T, available from TAYCA CORPORATION; and IT-S, available from ISHIHARA SANGYO KAISHA, LTD.

For acquiring hydrophobicity-treated oxide particles, hydrophobicity-treated silica particles, hydrophobicity-treated titania particles, or hydrophobicity-treated alumina particles, hydrophilic particles may be processed with a silane coupling agent, such as methyltrimethoxysilane, methyltriethoxysilane, and octyltrimethoxysilane. Moreover, silicone oil-processed oxide particles or silicone oil-processed inorganic particles are suitably used. The silicone oil-processed oxide particles or silicone oil-processed inorganic particles are obtained by processing oxide particles or inorganic particles with silicone oil optionally upon application of heat.

Examples of the silicone oil include dimethyl silicone oil, methylphenyl silicone oil, chlorophenyl silicone oil, methylhydrogen silicone oil, alkyl-modified silicone oil, fluorine-modified silicone oil, polyether-modified silicone oil, alcohol-modified silicone oil, amino-modified silicone oil, epoxy-modified silicone oil, epoxy/polyether-modified silicone oil, phenol-modified silicone oil, carboxyl-modified silicone oil, mercapto-modified silicone oil, methacrylic acid-modified silicone oil, and α-methylstyrene-modified silicone oil.

Examples of the inorganic particles include particles of silica, alumina, titanium oxide, barium titanate, magnesium titanate, calcium titanate, strontium titanate, iron oxide, copper oxide, zinc oxide, tin oxide, silica sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride. Among the above-listed examples, silica and titanium dioxide are preferable.

An amount of the above-mentioned other external additives is not particularly limited, and may be appropriately selected in accordance with the intended purpose. The amount of the above-mentioned other external additives relative to the toner is preferably 0.1% by mass or greater and 5% by mass or less, and more preferably 0.3% by mass or greater and 3% by mass or less.

<Production Method of Toner>

A production method of the toner is not particularly limited, and may be appropriately selected in accordance with the intended purpose. The toner is preferably granulated by dispersing an oil phase in an aqueous medium where the oil phase includes at least the amorphous polyester resin, the crystalline polyester resin, the release agent, and the colorant.

Examples of such a production method of the toner include a solution suspension method known in the art.

As another example of the toner production method, a method where toner base particles are formed by generating a product (may be also referred to as an "adhesive base" hereinafter) through an elongation reaction and/or a cross-linking reaction between the active hydrogen group-containing compound and the polymer having a site reactive with the active hydrogen group-containing compound will be described hereinafter. In the method described hereinafter, preparation of an aqueous medium, preparation of an oil phase including toner materials, emulsification or dispersion of the toner materials, removal of an organic solvent etc. are performed.

—Preparation of Aqueous Medium (Aqueous Phase)—

For example, the aqueous medium is prepared by dispersing resin particles in an aqueous medium. An amount of the resin particles added to the aqueous medium is not particularly limited, and may be appropriately selected in accordance with the intended purpose. The amount of the resin particles is preferably from 0.5% by mass through 10% by mass. The resin particles are not particularly limited, and may be appropriately selected in accordance with the intended purpose.

The aqueous medium is not particularly limited, and may be appropriately selected in accordance with the intended purpose. Examples of the aqueous medium include water, a solvent miscible with water, and a mixture of water and a solvent miscible with water. The above-listed examples may be used alone or in combination. Among the above-listed examples, water is preferable.

The solvent miscible with water is not particularly limited, and may be appropriately selected in accordance with the intended purpose. Examples of the solvent miscible with water include alcohol, dimethylformamide, tetrahydrofuran, cellosolves, and lower ketones.

The alcohol is not particularly limited, and may be appropriately selected in accordance with the intended purpose. Examples of the alcohol include methanol, isopropanol, and ethylene glycol.

The lower ketones are not particularly limited, and may be appropriately selected in accordance with the intended purpose. Examples of the lower ketones include acetone, and methyl ethyl ketone.

—Preparation of Oil Phase—

The oil phase including the toner materials is prepared by dissolving or dispersing toner materials (i.e., constituent components of toner base particles) in an organic solvent. The toner materials include the active hydrogen group-containing compound, the polymer having a site reactive with the active hydrogen group-containing compound, the crystalline polyester resin, the amorphous polyester resin, the release agent, the hybrid resin, and the colorant.

The organic solvent is not particularly limited, and may be appropriately selected in accordance with the intended purpose. The organic solvent is preferably an organic solvent having a boiling point of lower than 150° C. because such an organic solvent is easily removed.

The organic solvent having a boiling point of lower than 150° C. is not particularly limited, and may be appropriately selected in accordance with the intended purpose. Examples of the organic solvent having a boiling point of lower than 150° C. include toluene, xylene, benzene, carbon tetrachloride, methylene chloride, 1,2-dichloroethane, 1,1,2-trichloroethane, trichloroethylene, chloroform, monochlorobenzene, di chloroethylidene, methyl acetate, ethyl acetate, methyl ethyl ketone, and methyl isobutyl ketone. The above-listed examples may be used alone or in combination.

Among the above-listed examples, ethyl acetate, toluene, xylene, benzene, methylene chloride, 1,2-dichloroethane, chloroform, and carbon tetrachloride are preferable, and ethyl acetate is more preferable.

—Emulsification or Dispersion—

The emulsification or dispersion of the toner materials is performed by dispersing the oil phase including the toner materials in the aqueous medium. During the emulsification or dispersion of the toner materials, the active hydrogen group-containing compound and the polymer having a site reactive with the active hydrogen group-containing compound are allowed to react through an elongation reaction and/or a cross-linking reaction to synthesize an adhesive base.

For example, the adhesive base is synthesized in the following manner. An oil phase including a polymer reactive with an active hydrogen group (e.g., an isocyanate group-containing polyester prepolymer) is emulsified or dispersed in an aqueous medium together with an active hydrogen group-containing compound (e.g., amines) to react the polymer and the active hydrogen group-containing compound in the aqueous medium through an elongation reaction and/or a cross-linking reaction. Alternatively, an oil phase including constituent materials of toner base particles (may be also referred to as "toner materials") is emulsified or dispersed in an aqueous medium to which an active hydrogen group-containing compound has been added, and the polymer and the active hydrogen group-containing compound are allowed to react through an elongation reaction and/or a cross-linking reaction in the aqueous medium to synthesize the adhesive base. Moreover, the adhesive base may be synthesized by, after emulsifying or dispersing an oil phase including toner materials in an aqueous medium, adding an active hydrogen group-containing compound, and allowing the polymer and the active hydrogen group-containing compound to react through an elongation reaction and/or a cross-linking reaction at an interface of each particle (e.g., each oil droplet) in the aqueous medium. When the polymer and the active hydrogen group-containing compound are allowed to react through an elongation reaction and/or a cross-linking reaction at an interface of each particle, a urea-modified polyester resin is formed predominantly at a surface of each of the generated toner base particles to give a concentration gradient of the urea-modified polyester resin in each toner base particle.

The reaction conditions (e.g., reaction duration and a reaction temperature) for synthesizing the adhesive base are not particularly limited, and may be appropriately selected in accordance with a combination of an active hydrogen group-containing compound and a polymer having a site reactive with the active hydrogen group-containing compound.

The reaction duration is not particularly limited, and may be appropriately selected in accordance with the intended purpose. The reaction duration is preferably from 10 minutes through 40 hours, and more preferably from 2 hours through 24 hours.

The reaction temperature is not particularly limited, and may be appropriately selected in accordance with the intended purpose. The reaction temperature is preferably from 0° C. through 150° C., and more preferably from 40° C. through 98° C.

A method of stably forming dispersed elements each including the active hydrogen group-containing compound (e.g., an isocyanate group-containing polyester prepolymer) and the polymer having a site reactive with the active hydrogen group containing compound in the aqueous medium is not particularly limited, and may be appropriately selected in accordance with the intended purpose. Examples of the method include a method where an oil phase, which is prepared by dissolving or dispersing toner materials in a solvent, is added to an aqueous medium, and the resulting mixture is dispersed with a shearing force.

A disperser used for the dispersing is not particularly limited and may be appropriately selected in accordance with the intended purpose. Examples of the disperser include a low-speed shearing disperser, a high-speed shearing disperser, a friction disperser, a high-pressure jet disperser, and an ultrasonic disperser.

Among the above-listed examples, a high-speed shearing disperser is preferable as particle diameters of dispersed elements (i.e., oil droplets of the oil phase in the aqueous medium) can be adjusted to a range of from 2 μm to 20 μm. In the case where the high-speed shearing disperser is used, conditions, such as rotational speed, a dispersion time, and a dispersion temperature, are appropriately selected in accordance with the intended purpose.

The rotational speed is not particularly limited, and may be appropriately selected in accordance with the intended purpose. The rotational speed is preferably from 1,000 rpm through 30,000 rpm, and more preferably from 5,000 rpm through 20,000 rpm.

The dispersion duration is not particularly limited, and may be appropriately selected in accordance with the intended purpose. In case of a batch system, the dispersion duration is preferably from 0.1 minutes through 5 minutes.

The dispersion temperature is not particularly limited, and may be appropriately selected in accordance with the intended purpose. The dispersion temperature is preferably from 0° C. through 150° C., and more preferably from 40°

C. through 98° C. under pressure. Generally speaking, dispersion is performed easier when the dispersion temperature is a high temperature.

An amount of the aqueous medium used for emulsifying or dispersing the constituent components of the toner base particles (may be also referred to as the "toner materials") is not particularly limited, and may be appropriately selected in accordance with the intended purpose. The amount of the aqueous medium is preferably from 50 parts by mass through 2,000 parts by mass, and more preferably from 100 parts by mass through 1,000 parts by mass, relative to 100 parts by mass of the toner materials.

When the amount of the aqueous medium is less than 50 parts by mass, the toner materials may not be desirably dispersed, consequently not being able to form toner base particles having desired particle diameters. When the amount of the aqueous medium is greater than 2,000 parts by mass, production cost may increase.

When the oil phase including the toner materials is emulsified or dispersed, a dispersing agent is preferably used for stabilizing dispersed elements (e.g., oil droplets) to make particles having desired shapes and a sharp particle size distribution.

The dispersing agent is not particularly limited, and may be appropriately selected in accordance with the intended purpose. Examples of the dispersing agent include a surfactant, a poorly water-soluble inorganic compound dispersing agent, and a polymer-based protective colloid. The above-listed examples may be used alone or in combination. Among the above-listed examples, a surfactant is preferable.

The surfactant is not particularly limited, and may be appropriately selected in accordance with the intended purpose. Examples of the surfactant include an anionic surfactant, a cationic surfactant, a nonionic surfactant, and an amphoteric surfactant.

The anionic surfactant is not particularly limited, and may be appropriately selected in accordance with the intended purpose. Examples of the anionic surfactant include an alkyl benzene sulfonic acid salt, an α-olefin sulfonic acid salt, and a phosphoric acid ester.

Among the above-listed examples, a fluoroalkyl group-containing surfactant is preferable.

A catalyst may be used for an elongation reaction and/or a cross-linking reaction for generating the adhesive base.

The catalyst is not particularly limited, and may be appropriately selected in accordance with the intended purpose. Examples of the catalyst include dibutyl tin laurate, and dioctyl tin laurate.

—Removal of Organic Solvent—

A method of removing the organic solvent from the dispersion liquid, such as emulsified slurry, is not particularly limited, and may be appropriately selected in accordance with the intended purpose. Examples of the method include: a method where an entire reaction system is gradually heated to evaporate the organic solvent in the oil droplets; and a method where the dispersion liquid is sprayed in a dry atmosphere to remove the organic solvent in the oil droplets.

Once the organic solvent is removed, toner base particles are yielded. Washing, drying, etc., may be performed on the resulting toner base particles. The classification may be performed by removing the fine particle component by cyclone in a liquid, a decanter, or centrifugation. Alternatively, the classification may be performed after drying.

The obtained toner base particles may be mixed with other particles, such as the external additive, and the charge-controlling agent. As mechanical impacts are applied to the resulting particle mixture, detachment of the particles of the external additive etc. from surfaces of the toner base particles may be minimized.

A method of applying the mechanical impact is not particularly limited, and may be appropriately selected in accordance with the intended purpose. Examples of the method include: a method of applying impact force to the mixture using a blade rotated at high speed; and a method where the mixture is added to a high-speed air flow to accelerate the motion of the particles to make the particles crush into one another or to make the particles crush into a suitable impact board.

A device used for the above-described method is not particularly limited, and may be appropriately selected in accordance with the intended purpose. Examples of the device include an angmill (available from HOSOKAWA MICRON CORPORATION), a device obtained by modifying an I-type mill (available from Nippon Pneumatic Mfg. Co., Ltd.) to reduce pulverization air pressure, a hybridization system (available from NARA MACHINERY CO., LTD.), Kryptron System (available from Kawasaki Heavy Industries, Ltd.), and an automatic mortar.

<Developer>

The developer of the present disclosure includes at least the toner, and may further include appropriately selected other components, such as a carrier.

Since the developer includes the toner of the present disclosure, both excellent transfer properties and excellent cleaning properties are achieved, and high-quality images are stably formed. The developer may be a one-component developer or a two-component developer. In the case where the developer is used for high-speed printers corresponding to the information processing speed that has been improved in recent years, the developer is preferably a two-component developer considering improvement in service life of the developer.

When the developer is a one-component developer, particle diameters of the toner particles do not noticeably vary even after replenishing the developer (i.e., the toner). Therefore, filming of the toner to a developing roller is minimized, or fusion of the toner to a member used for leveling the toner into a thin layer, such as a blade, is reduced. As a result, excellent and stable developing performance and formation of excellent images are assured even after stirring the developer in a developing device over a long period.

When the developer is a two-component developer, particle diameters of the toner particles do not noticeably vary even after replenishing the developer with the toner over a long period. As a result, excellent and stable developing performance and formation of excellent images are assured even after stirring the developer in a developing device over a long period.

When the toner is used for a two-component developer, the toner may be mixed with the carrier. An amount of the carrier in the two-component developer is not particularly limited, and may be appropriately selected in accordance with the intended purpose. The amount of the carrier is preferably from 90% by mass through 98% by mass, and more preferably from 93% by mass through 97% by mass.

<Carrier>

The carrier is not particularly limited, and may be appropriately selected in accordance with the intended purpose. The carrier includes carrier particles. Each of the carrier particles preferably includes a core particle and a resin layer covering the core particle.

—Core Particles—

A material of the core particles is not particularly limited, and may be appropriately selected in accordance with the intended purpose. Examples of the material of the core particles include a manganese-strontium-based material of from 50 emu/g through 90 emu/g and a manganese-magnesium-based material of from 50 emu/g through 90 emu/g. Moreover, a hard-magnetic material, such as iron powder of 100 emu/g or greater and magnetite of from 75 emu/g through 120 emu/g for assuring desired image density. Moreover, a soft-magnetic material, such as a copper-zinc-based material of from 30 emu/g through 80 emu/g, is preferably used because the impact of the developer held in the form of a brush (i.e., a magnetic brush) against the photoconductor can be reduced, leading to a high image quality.

The above-listed examples may be used alone or in combination.

A volume average particle diameter of the core particles is not particularly limited, and may be appropriately selected in accordance with the intended purpose. The volume average particle diameter of the core particles is preferably from 10 μm through 150 μm, and more preferably from 40 μm through 100 μm.

When the volume average particle diameter of the core particles is less than 10 μm, a proportion of fine particles to the entire amount of the core particles increases, and the increased proportion of the fine particles lowers magnification per particle, consequently causing toner scattering. When the volume average particle diameter of the core particles is greater than 150 μm, a resulting carrier has a small specific surface area, and the carrier having the small specific surface area may cause toner scattering, consequently impairing reproducibility of a solid image, especially in a full-color image having a large solid image area.

—Resin Layer—

A material of the resin layer is not particularly limited, and may be appropriately selected from resins known in the art. Examples of the material of the resin layer include an amino-based resin, a polyvinyl-based resin, a polystyrene-based resin, a polyhalogenated olefin, a polyester-based resin, a polycarbonate-based resin, polyethylene, polyvinyl fluoride, polyvinylidene fluoride, polytrifluoroethylene, polyhexafluoropropylene, a vinylidene fluoride/acryl monomer copolymer, a vinylidene fluoride/vinyl fluoride copolymer, a fluoroterpolymer made from tetrafluoroethylene, vinylidene fluoride, and a monomer that does not include a fluoro group, and a silicone resin.

The above-listed examples may be used alone or in combination.

The amino-based resin is not particularly limited, and may be appropriately selected in accordance with the intended purpose. Examples of the amino-based resin include a urea-formamide resin, a melamine resin, a benzoguanamine resin, a urea resin, a polyamide resin, and an epoxy resin.

The polyvinyl-based resin is not particularly limited, and may be appropriately selected in accordance with the intended purpose. Examples of the polyvinyl-based resin include an acrylic resin, polymethyl methacrylate, polyacrylonitrile, polyvinyl acetate, polyvinyl alcohol, and polyvinyl butyral.

The polystyrene-based resin is not particularly limited, and may be appropriately selected in accordance with the intended purpose. Examples of the polystyrene-based resin include polystyrene, and a styrene-acryl copolymer.

The polyhalogenated olefin is not particularly limited, and may be appropriately selected in accordance with the intended purpose. Examples of the polyhalogenated olefin include polyvinyl chloride.

The polyester-based resin is not particularly limited, and may be appropriately selected in accordance with the intended purpose. Examples of the polyester-based resin include polyethylene terephthalate, and polybutylene terephthalate.

The resin layer may optionally include conductive powder. The conductive powder is not particularly limited, and may be appropriately selected in accordance with the intended purpose. Examples of the conductive powder include metal powder, carbon black, titanium oxide, tin oxide, and zinc oxide. The average particle diameter of the conductive powder is preferably 1 μm or less. When the average particle diameter of the conductive layer is greater than 1 μm, it may be difficult to control electric resistance.

The resin layer may be formed by, after dissolving a silicone resin etc. in a solvent to prepare a coating liquid, applying the coating liquid to surfaces of core particles in accordance with any of coating methods known in the art, and drying the applied coating liquids, followed by baking.

The coating methods are not particularly limited, and may be appropriately selected in accordance with the intended purpose. Examples of the coating methods include dip coating, spray coating, and brush coating.

The solvent is not particularly limited, and may be appropriately selected in accordance with the intended purpose. Examples of the solvent include toluene, xylene, methyl ethyl ketone, methyl isobutyl ketone, and butyl cellosolve acetate.

The baking may be performed in an external heating system, or in an internal heating system. Examples of the baking include: a method using a fixed electric furnace, a flow electric furnace, a rotary electric furnace, a gas furnace with a furnace burner, etc.; and a method using microwaves.

An amount of the resin layer in the carrier is not particularly limited, and may be appropriately selected in accordance with the intended purpose. The amount of the resin layer is preferably from 0.01% by mass through 5.0% by mass. When the amount of the resin layer is less than 0.01% by mass, a resin layer may not be uniformly formed on a surface of each core particle. When the amount of the resin layer is greater than 5.0% by mass, the resulting carrier particles may be fused to one another because the resin layer is thick, consequently impairing homogeneity of the resulting carrier particles.

(Toner Storage Unit)

The toner storage unit of the present disclosure includes a unit configured to store a toner, and the toner of the present disclosure, where the toner is stored in the unit. Examples of an embodiment of the toner storage unit include a toner storage container, a developing device, and a process cartridge.

The toner storage container includes a container in which the toner is stored.

The developing device is a unit that contains the toner and is configured to develop an electrostatic latent image with the toner.

<Process Cartridge>

A process cartridge discussed in connection with the present disclosure is configured so that the process cartridge is detachably mounted in various image forming apparatuses. The process cartridge includes at least a photoconductor configured to bear an electrostatic latent image, and a developing unit configured to develop the electrostatic latent image borne on the photoconductor with the developer of the present disclosure to form a toner image (may be also referred to as a "visible image"). The process cartridge of the present disclosure may further include other units according to the necessity.

The developing unit includes a developer storage unit in which the developer of the present disclosure is stored, and a developer bearing member configured to bear the developer, which is stored in the developer storage unit, on a surface of the developer bearing member and to transport the developer. The developing unit may further include a regulating member configured to regulate a thickness of a layer of the developer borne on the developer bearing member.

When the toner storage unit is mounted in an image forming apparatus and images are formed by such an image forming apparatus, high-quality and highly-precise images are stably formed over a long period taking advantage of the characteristics of the toner that can achieve excellent hot-offset resistance, charging stability, stress resistance, and background-deposition resistance.

(Image Forming Apparatus and Image Forming Method)

The image forming apparatus of the present disclosure includes at least an electrostatic latent image bearer, an electrostatic latent image forming unit, and a developing unit. The image forming apparatus may further include other units according to the necessity.

The image forming method discussed in connection with the present disclosure includes at least forming an electrostatic latent image, and developing. The image forming method may further include other steps according to the necessity.

The image forming method is suitably performed by the image forming apparatus. The forming an electrostatic latent image is suitably performed by the electrostatic latent image forming unit. The developing is suitably performed by the developing unit. The above-mentioned other steps may be suitably performed by the above-mentioned other units.

The image forming apparatus of the present disclosure more preferably includes an electrostatic latent image bearer, an electrostatic image forming unit configured to form an electrostatic latent image on the electrostatic latent image bearer, a developing unit that stores a toner and is configured to develop the electrostatic latent image formed on the electrostatic latent image bearer with the toner to form a toner image, a transferring unit configured to transfer the toner image formed on the electrostatic latent image bearer to a surface of a recording medium, and a fixing unit configured to fix the toner image transferred on the surface of the recording medium.

Moreover, the image forming method of the present disclosure more preferably includes forming an electrostatic latent image on an electrostatic latent image bearer, developing the electrostatic latent image formed on the electrostatic latent image bearer with a toner to form a toner image, transferring the toner image formed on the electrostatic latent image bearer to a surface of a recording medium, and fixing the toner image transferred to the surface of the recording medium.

The toner is used in the developing unit. Preferably, a developer including the toner and optionally other components, such as a carrier, is used in the developing unit to form the above-described toner image.

<Electrostatic Latent Image Bearer>

A material, structure, and size of the electrostatic latent image bearer (may be also referred to as a "photoconductor") are not particularly limited, and may be appropriately selected from those known in the art. Examples of the material of the electrostatic latent image bearer include inorganic photoconductors (e.g., amorphous silicon, and selenium), and organic photoconductors (e.g., polysilane, and phthalo polymethine).

<Electrostatic Latent Image Forming Unit>

The electrostatic latent image forming unit is not particularly limited, provided that the electrostatic latent image forming unit is a unit configured to form an electrostatic latent image on the electrostatic latent image bearer. The electrostatic latent image forming unit may be appropriately selected in accordance with the intended purpose. Examples of the electrostatic latent image forming unit include a unit including a charging member configured to charge a surface of the electrostatic latent image bearer, and an exposing member configured to expose the charged surface of the electrostatic latent image bearer to light to correspond to an image to be formed.

<Developing Unit>

The developing unit is not particularly limited, provided that the developing unit stores a toner and is configured to develop the electrostatic latent image formed on the electrostatic latent image bearer with the toner to form a visible image. The developing unit may be appropriately selected in accordance with the intended purpose.

<Cleaning Unit>

The image forming apparatus of the present disclosure preferably further includes a cleaning unit.

As described above, the toner of the present disclosure has excellent cleaning properties. Therefore, cleaning properties are improved further by using the toner in the image forming apparatus including the cleaning unit, as described below.

Even when stress is applied to the toner, flowability of the toner is maintained owing to an improved effect of the toner base particles as a spacer, consequently improving cleaning properties.

An adequate amount of the external additive (e.g., the zinc stearate particles) is released from the toner on the photoconductor to form a deposited layer (i.e., a dam layer) of the external additive at a nip with a cleaning blade, consequently achieving excellent cleaning properties.

The cleaning unit is not particularly limited, provided that the cleaning unit is a unit capable of removing the residual toner on the photoconductor. The cleaning unit may be appropriately selected in accordance with the intended purpose. Examples of the cleaning unit include a magnetic brush cleaner, an electrostatic brush cleaner, a magnetic roller cleaner, a blade cleaner, a brush cleaner, and a web cleaner.

<Other Units>

Examples of the above-mentioned other units include a transferring unit, a fixing unit, a charge-eliminating unit, a recycling unit, and a controlling unit.

Next, one embodiment for carrying out a method of forming an image using the image forming apparatus of the present disclosure will be described with reference to FIG. 1.

FIG. 1 illustrates an example of the image forming apparatus of the present disclosure. A color image forming apparatus 100A of FIG. 1 includes a photoconductor drum 10 (may be referred to as a "photoconductor 10" hereinafter) serving as the electrostatic latent image bearer, a charging roller 20 serving as the charging unit, an exposure device 30 serving as the exposing unit, a developing device 40 serving as the developing unit, an intermediate transfer member 50, a cleaning device 60 serving as the cleaning unit having a cleaning blade, and a charge-eliminating lamp 70 serving as the charge-eliminating unit.

The intermediate transfer member 50 is an endless belt, and is rotatably driven by three rollers 51 in the direction indicated with an arrow in FIG. 1. The three rollers 51 are disposed inside the loop of the endless belt to support the endless belt. Some of the three rollers 51 may also function as a transfer bias roller capable of applying predetermined transfer bias (or primary transfer bias) to the intermediate transfer member 50. The cleaning device 90 including the cleaning blade is disposed closely to the intermediate transfer member 50. Moreover, the transfer roller 80 is disposed closely to the intermediate transfer member 50 in a manner that the transfer roller 80 faces the intermediate transfer member 50. The transfer roller serves as the transferring unit capable of applying transfer bias for transferring (or secondary transferring) the developed image (also referred to as the visible image or the toner image) to transfer paper P serving as the recording medium. The corona charger 52 configured to apply charge to the toner image on the intermediate transfer member 50 is disposed at the periphery of the intermediate transfer member 50. The position of the corona charger 52 is located between a contact area (a) and a contact area (b) relative to the rotational direction of the intermediate transfer member 50, the contact area (a) being a contact area between a photoconductor 10 and the intermediate transfer member 50, and the contact area (b) being a contact area between the intermediate transfer member 50 and the transfer paper P.

A black developing unit 45K, a yellow developing unit 45Y, a magenta developing unit 45M, and a cyan developing unit 45C are disposed at the periphery of the photoconductor drum 10 to directly face the photoconductor drum 10. The black developing unit 45K includes a developer storage unit 42K, a developer supply roller 43K, and a developing roller 44K. The yellow developing unit 45Y includes a developer storage unit 42Y, a developer supply roller 43Y, and a developing roller 44Y. The magenta developing unit 45M includes a developer storage unit 42M, a developer supply roller 43M, and a developing roller 44M. The cyan developing unit 45C includes a developer storage unit 42C, a developer supply roller 43C, and a developing roller 44C. Moreover, the developing belt 41 is an endless belt rotatably supported by two or more belt rollers. Part of the developing belt 41 comes into contact with the electrostatic latent image bearer 10.

In the color image forming apparatus 100A of FIG. 1, for example, the charging roller 20 uniformly charges a surface of the photoconductor drum 10. The exposure device 30 exposes the charged surface of the photoconductor drum 10 to light to correspond to an image to be formed to form an electrostatic latent image. The toner is supplied from the developing device 40 to develop the electrostatic latent image formed on the photoconductor drum 10 to form a toner image. Voltage is applied from the roller 51 to the toner image to transfer (or primary transfer) the toner image onto the intermediate transfer member 50, followed by transferring (or secondary transferring) onto transfer paper P. As a result, the transferred image is formed on the transfer paper P. The residual toner on the photoconductor 10 is removed by the cleaning device 60. The residual charge of the photoconductor 10 is temporarily removed by the charge-eliminating lamp 70.

Figure 2:
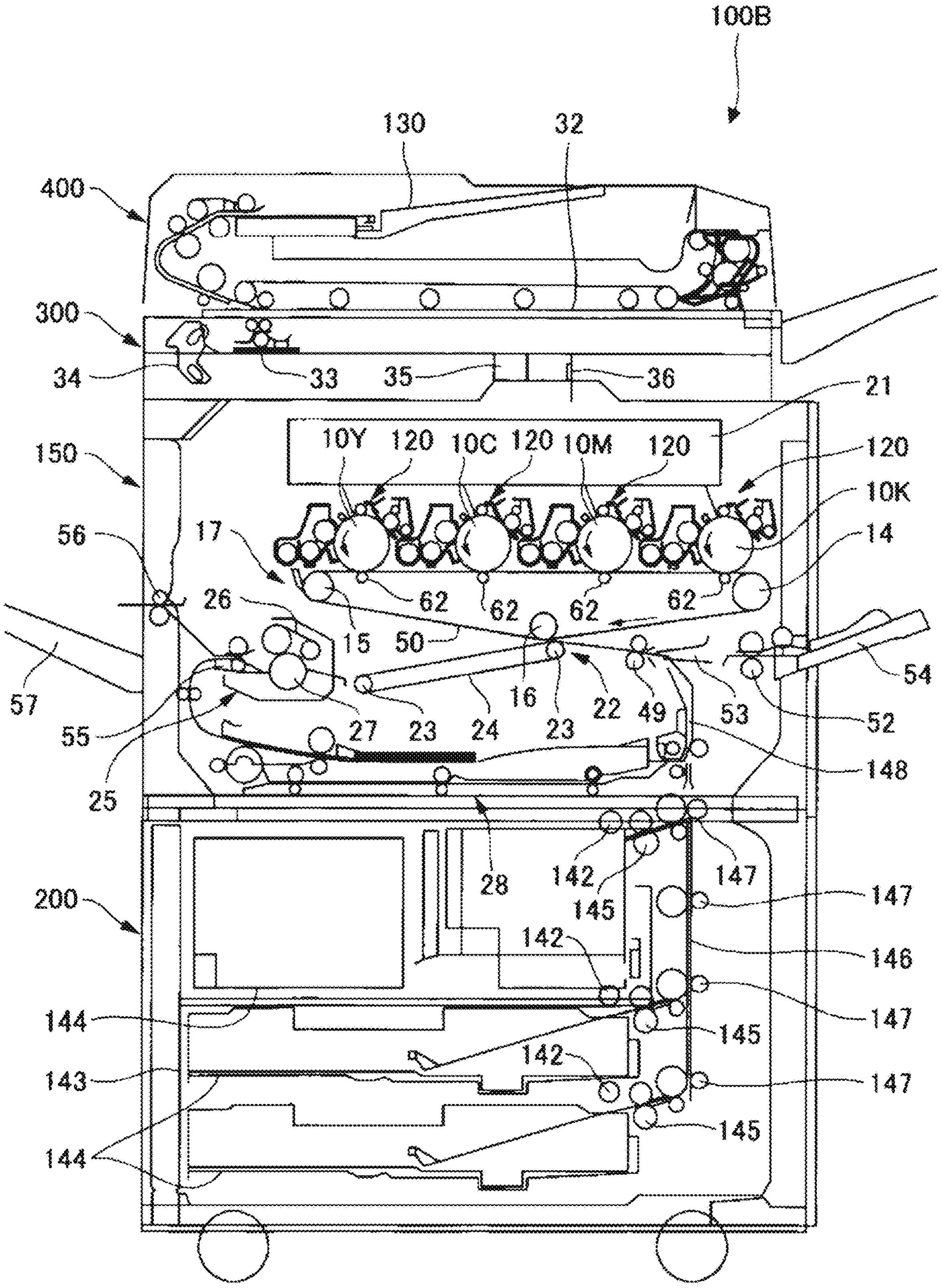
FIG. 2 is a schematic view illustrating another example of the image forming apparatus using the toner of the present disclosure.

FIG. 2 illustrates another example of the image forming apparatus of the present disclosure. The image forming apparatus 100B of FIG. 2 includes a photocopier main body 150, a paper feeding table 200, a scanner 300, and an automatic document feeder (ADF) 400.

An intermediate transfer member 50, which is an endless belt, is disposed at the central part of the photocopier main body 150. The intermediate transfer member 50 is supported by support rollers 14, 15, and 16, and is rotatably disposed in the clockwise direction in FIG. 2. An intermediate transfer member cleaning device 17 is disposed closely to the support roller 15. The intermediate transfer member cleaning device 17 is configured to remove the residual toner on the intermediate transfer member 50. A tandem developing device 120 is disposed to face the section of the intermediate transfer member 50 supported by the support rollers 14 and 15. In the tandem developing device 120, four image forming units 120, i.e., a yellow image forming unit, a cyan image forming unit, a magenta image forming unit, and a black image forming units, are arranged in series along the travelling direction of the intermediate transfer member 50. An exposure device 21 serving as the exposing member is disposed closely to the tandem developing device 120. A secondary transfer device 22 is disposed to the side of the intermediate transfer member 50 opposite to the side where the tandem developing device 120 is disposed. The secondary transfer device 22 includes a secondary transfer belt 24. The secondary transfer belt 24 is an endless belt and is supported by a pair of rollers 23. Transfer paper borne on and transported by the secondary transfer belt 24 comes into contact with the intermediate transfer member 50. A fixing device 25 serving as the fixing member is disposed closely to the secondary transfer device 22. The fixing device 25 includes a fixing belt 26, which is an endless belt, and a press roller 27 disposed to press against the fixing belt 26.

The tandem image forming apparatus includes a sheet reverser 28 disposed closely to the secondary transfer device 22 and to the fixing device 25. The sheet reverser 28 is configured to reverse transfer paper to perform image formation on both sides of the transfer paper.

Next, formation of a full-color image (i.e., a color copy) using the tandem developing device 120 will be described. First, a document is set on a document table 130 of the automatic document feeder (ADF) 400. Alternatively, a document is set on contact glass 32 of a scanner 300 by opening the automatic document feeder 400. Once the document is set, the automatic document feeder 400 is closed.

Once start switch (not illustrated) is pressed, if the document is set on the automatic document feeder 400, the document is transported onto the contact glass 32, then the scanner 300 is driven. If the document is initially set on the contact glass 32, the scanner 300 is immediately driven once the start switch is pressed. Then, a first carriage 33 and a second carriage 34 are driven to scan the document. During the scanning, the first carriage 33 irradiates a surface of the document with light emitted from a light source, the light reflected from the surface of the document is again reflected by a mirror of the second carriage 34 to pass through an imaging forming lens 35. The light is then received by a reading sensor 36 to read the color document (e.g., the color image) to acquire image information of black, yellow, magenta, and cyan.

Figure 3:
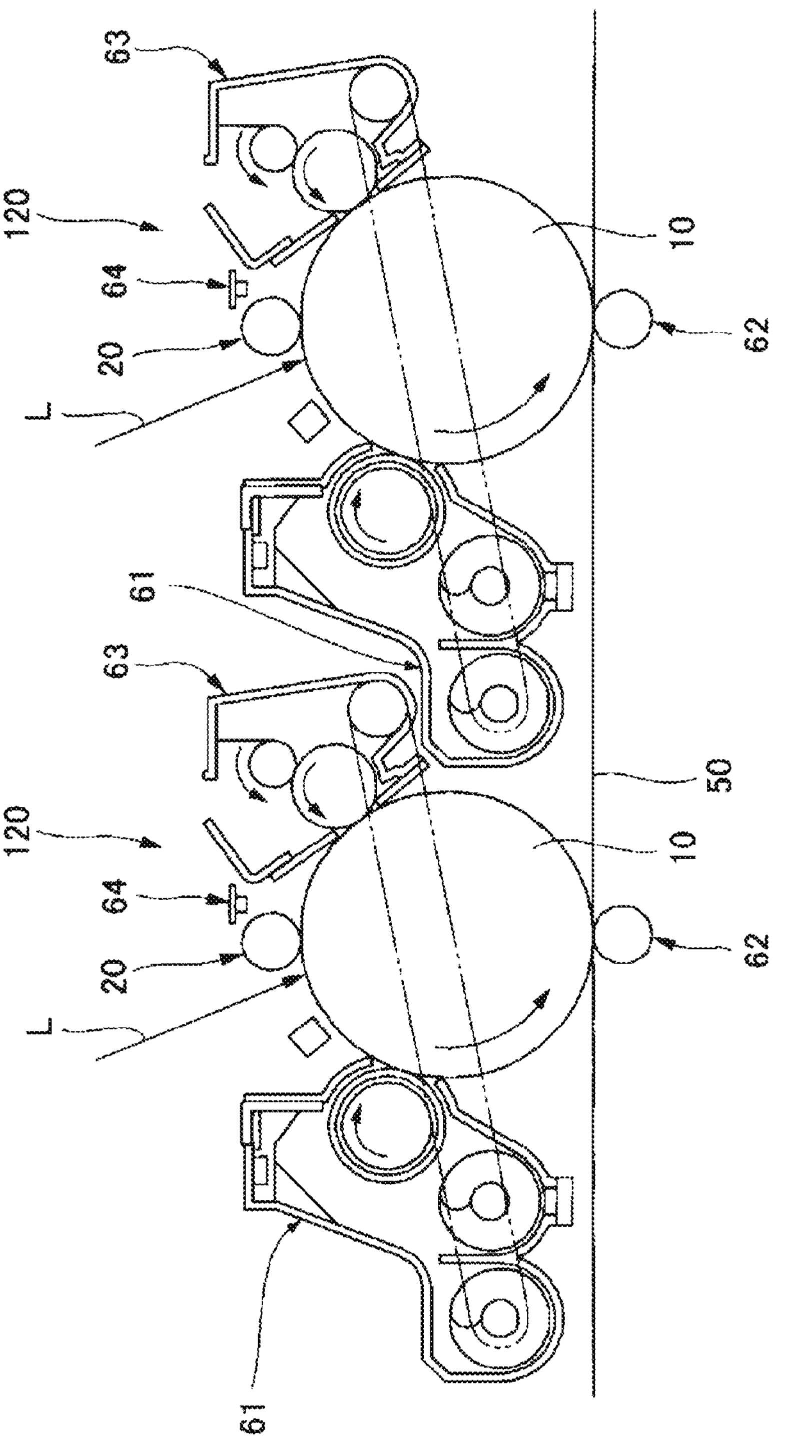
FIG. 3 is an enlarged partial view of FIG. 2.

The image information of each of black, yellow, magenta, and cyan is transmitted to the corresponding image forming unit 120 (the black image forming unit, the yellow image forming unit, the magenta image forming unit, or the cyan image forming unit) of the tandem developing device 120. By means of each image forming unit, a toner image of each color (black, yellow, magenta, or cyan) is formed. Specifically, as illustrated in FIG. 3, each image forming unit 120 (the black image forming unit, the yellow image forming unit, the magenta image forming unit, or the cyan image forming unit) of the tandem developing device 120 includes: an electrostatic latent image bearer 10 (a black electrostatic latent image bearer 10K, a yellow electrostatic latent image bearer 10Y, a magenta electrostatic latent image bearer 10M, or a cyan electrostatic latent image bearer 10C); a charging device 20 that is the charging device configured to uniformly charge a surface of the electrostatic latent image bearer 10; an exposure device configured to expose the electrostatic latent image bearer to light (L in FIG. 3) to correspond to each color image based on the corresponding color image information, to thereby form an electrostatic latent image corresponding to each color image on the electrostatic latent image bearer; a developing device 61 configured to develop the electrostatic latent image with the corresponding color toner (the black toner, the yellow toner, the magenta toner, or the cyan toner), to thereby form a toner image of the corresponding color toner; a transfer charger 62 configured to transfer the toner image to an intermediate transfer member 50; a cleaning device 63; and a charge-eliminating unit 64. Each image forming unit 120 can form an image of a single color (e.g., a black image, a yellow image, a magenta image, and a cyan image) based on the corresponding color image information. The black image formed on the black electrostatic latent image bearer 10K, the yellow image formed on the yellow electrostatic latent image bearer 10Y, the magenta image formed on the magenta electrostatic latent image bearer 10M, and the cyan image formed on the cyan electrostatic latent image bearer 10C in the above-described manner are sequentially transferred (or primary transferred) onto the intermediate transfer member 50 that is rotatably supported by the support rollers 14, 15, and 16. The black image, the yellow image, the magenta image, and the cyan image are superimposed on the intermediate transfer member 50 to form a composite color image (i.e., a transferred color image).

In the paper feeding table 200, meanwhile, one of paper feeding rollers 142 is selectively driven to rotate to feed sheets (i.e., recording paper) from one of paper feeding cassettes 144 stacked in a paper bank 143. The sheets are separated one by one by a separation roller 145 to feed each sheet into a paper feeding path 146, and the fed sheet is transported by a transport roller 147 to guide the sheet into a paper feeding path 148 inside the photocopier main body 150. The sheet is then let collide with a registration roller 49 to stop. Alternatively, a paper feeding roller 142 is driven to rotate to feed sheets (i.e., recording paper) on a manual feed tray 54, the sheets are separated and fed into a manual paper feeding path 53 one by one with a separation roller 52. Similarly, the fed sheet is let collide with a registration roller 49 to stop. The registration roller 49 is typically earthed during use, but the registration roller 49 may be used in the state where bias is applied to the registration roller 49 for removing paper dusts from sheets. Synchronizing with the timing of the composite color image (i.e., the transferred color image) formed on the intermediate transfer member 50, the registration roller 49 is driven to rotate to feed the sheet (i.e., the recording paper) between the intermediate transfer member 50 and the secondary transfer device 22. The composite color image (i.e., the transferred color image) is then transferred (or secondary transferred) onto the sheet (i.e., the recording paper) by the secondary transfer device 22. In the manner as described above, the color image is transferred and formed onto the sheet (i.e., the recording paper). After transferring the image, the residual toner on the intermediate transfer member 50 is cleaned by the intermediate transfer member cleaning device 17.

The sheet (i.e., the recording paper) on which the color image has been transferred is transported by the secondary transfer device 22 to send the sheet to the fixing device 25. By means of the fixing device 25, heat and pressure are applied to the composite color image (i.e., the transferred color image) to fix the composite color image to the sheet (i.e., the recording paper). Thereafter, the traveling direction of the sheet (i.e., the recording paper) is switched by the switching claw 55 to eject the sheet (i.e., the recording paper) with an ejection roller 56 to stack the sheet (i.e., the recording paper) on the paper ejection tray 57. Alternatively, the traveling direction of the sheet (i.e., the recording paper) is switched by the switching claw 55 and the sheet is flipped by the sheet reverser 28 to send the sheet back to the transfer position. After recording an image also on the back side of the sheet, the sheet is ejected by the ejection roller 56 to stack on the paper ejection tray 57.

Figure 4:
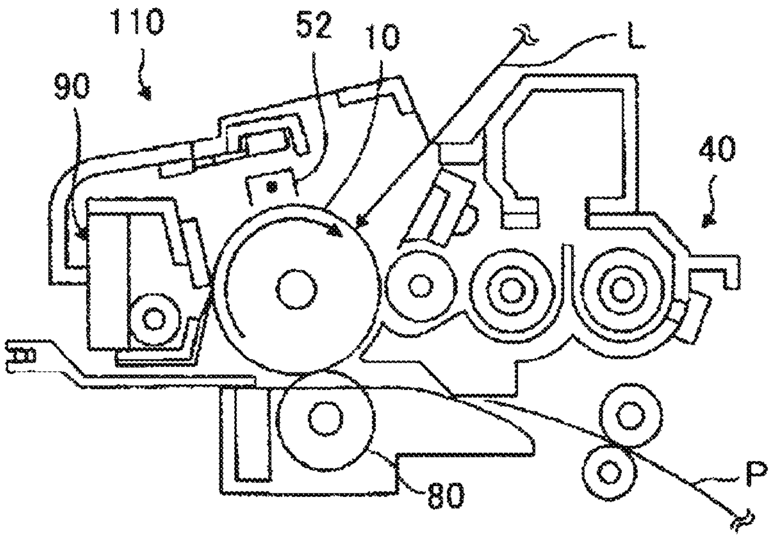
FIG. 4 is a schematic view illustrating an example of a process cartridge.

FIG. 4 illustrates an example of the process cartridge discussed in connection with the present disclosure. The process cartridge 110 includes a photoconductor drum 10, a corona discharger 52, a developing device 40, a transfer roller 80, and a cleaning device 90.

EXAMPLES

The present disclosure will be described below by way of Examples. The present disclosure should not be construed as being limited to these Examples. In Examples, "part(s)" denotes "part(s) by mass" and "%" denotes "% by mass" unless otherwise stated.

Production Example 1 of Resin Particle Dispersion Liquid

A reaction vessel equipped with a stirrer, a heating and cooling device, and a thermometer was charged with 3,710 parts by mass of water, and 200 parts by mass of polyoxyethylene-1-(allyloxymethyl)alkyl ether ammonium sulfate (HITENOL KH-1025, available from DKS Co., Ltd.). The resulting mixture was stirred at 200 rpm to homogenize the mixture. Thereafter, the resulting mixture was heated until the temperature of the internal system reached 75° C. To the heated mixture, 90 parts by mass of a 10% by weight ammonium persulfate aqueous solution was added, followed by adding a mixture including 450 parts by mass of styrene, 250 parts by mass of butyl acrylate, and 300 parts by mass of methacrylic acid by dripping over the course of 4 hours.

After the dripping, the resulting mixture was matured for 4 hours at 75° C., to thereby obtain Dispersion Liquid 1 of resin particles (A1) each formed of a core resin (a1) that was a polymer obtained by copolymerizing the styrene, the butyl acrylate, the methacrylic acid, and the polyoxyethylene-1-(allyloxymethyl)alkyl ether ammonium sulfate.

A volume average particle diameter of the resin particles A1 in Dispersion Liquid 1 was measured by dynamic light scattering (an electrophoretic light scattering device, ELS-8000, available from Otsuka Electronics Co., Ltd.). As a result, the volume average particle diameter was 15 nm. Part of Dispersion Liquid 1 was dried to separate the core resin (a1) and a glass transition temperature (Tg) of the core resin (a1) was measured. As a result, the glass transition temperature (Tg) of the core resin was 75° C. Moreover, an acid value of the core resin (a1) was measured. The acid value of the core resin (a1) was 195 mgKOH/g.

Production Example 2 of Resin Particle Dispersion Liquid

A reaction vessel equipped with a stirrer, a heating and cooling device, and a thermometer was charged with 667 parts by mass of Dispersion Liquid 1, 248 parts by mass of water, and 0.267 parts by mass of tert-butyl hydroperoxide (PERBUTYL H, available from NOF CORPORATION). The resulting mixture was heated until the temperature of the internal system reached 70° C. To the heated mixture, 43.3 parts by mass of styrene, 23.3 parts by mass of butyl acrylate, and 18.0 parts by mass of a 1% by mass ascorbic acid aqueous solution were added by dripping over the course of 2 hours.

After the dripping, the resulting mixture was matured for 4 hours at 70° C., to thereby obtain Dispersion Liquid 2 of resin particles (A2) including, as constituent components, the core resin (a1) and a shell resin (a2) in each particle, where the shell resin (a2) was a polymer obtained by copolymerizing the tert-butyl hydroperoxide, the styrene, and the butyl acrylate.

A volume average particle dimeter of the resin particles (A2) in Dispersion Liquid 2 was measured in the same manner as in the measurement of the volume average particle diameter of the resin particles (A1). As a result, the volume average particle diameter of the resin particles (A2) was 17.3 nm. Moreover, Dispersion Liquid 2 was neutralized with a 10% by mass ammonia solution to be pH 9.0. Centrifuge separation of the resulting dispersion liquid was performed. The separated sediment was dried and solidified to thereby separate the shell resin (a2). A glass transition temperature (Tg) of the shell resin (a2) was measured in the same manner as the measurement of the glass transition temperature (Tg) of the core resin (a1). As a result, the glass transition temperature (Tg) of the shell resin (a2) was 61° C.

Whether or not the resin particles (A2) in Dispersion Liquid 2 included, as constituent components, the core resin (a1) and the shell resin (a2) in each particle was confirmed in the following manner.

Specifically, 2 parts by mass of gelatin (Cook Gelatin, available from MORINAGA & CO., LTD.) was added to and dissolved in 15 parts of water heated to a temperature of from 95° C. through 100° C. To the resulting gelatin aqueous solution, which had been air-cooled to 40° C., Dispersion Liquid 2 was added at a mass ratio of 1:1. After sufficiently stirring the resulting mixture, the mixture was cooled at 10° C. for 1 hour to set the mixture to form a gel.

The gel was cut by means of an ultramicrotome (Ultramicrotome UC7, FC7, available from Leica Microsystems) with controlling a temperature at −80° C. to produce a cut piece having a thickness of 80 nm. Then, the cut piece was dyed with a vapor phase of a 2% ruthenium tetroxide aqueous solution for 5 minutes. The dyed cut piece was observed under a transmission electron microscope (H-7100, available from Hitachi High-Tech Corporation). It was confirmed that each of the particles had a core-shell structure.

Production Example 3 of Resin Particle Dispersion Liquid

A reaction vessel equipped with a stirrer, a heating and cooling device, and a thermometer was charged with 3,810 parts by mass of water and 100 parts by mass of polyoxyethylene-1-(allyloxymethyl)alkyl ether ammonium sulfate (HITENOL KH-1025, available from DKS Co., Ltd.). The resulting mixture was stirred at 200 rpm to homogenize the mixture. The homogenized mixture was heated to increase the internal system temperature to 75° C. Thereafter, 90 parts of a 10% by mass ammonium persulfate aqueous solution was added, followed by adding a mixture including 400 parts by mass of styrene, 300 parts by mass of butyl acrylate, and 300 parts by mass of methacrylic acid by dripping over the course of 4 hours.

After the dripping, the resulting mixture was matured for 4 hours at 75° C., to thereby acquire Dispersion Liquid 3 of resin particles (B1) each formed of a core resin (b1) that was a polymer obtained by copolymerizing the styrene, the butyl acrylate, the methacrylic acid, and polyoxyethylene-1-(allyloxymethyl)alkyl ether ammonium sulfate.

A volume average particle diameter of the resin particles B1 in Dispersion Liquid 3 was measured by dynamic light scattering (an electrophoretic light scattering device, ELS-8000, available from Otsuka Electronics Co., Ltd.). As a result, the volume average particle diameter was 45 nm. Part of Dispersion Liquid 3 was dried to separate the core resin (b1) and a glass transition temperature (Tg) of the core resin (b1) was measured. As a result, the glass transition temperature (Tg) of the core resin (b1) was 65° C. Moreover, an acid value of the core resin (b1) was measured. The acid value of the core resin (b1) was 195 mgKOH/g.

Production Example 4 of Resin Particle Dispersion Liquid

A reaction vessel equipped with a stirrer, a heating and cooling device, and a thermometer was charged with 667 parts by mass of Dispersion Liquid 3, 248 parts by mass of water, and 0.267 parts by mass of tert-butyl hydroperoxide (PERBUTYL H, available from NOF CORPORATION). The resulting mixture was heated until the temperature of the internal system reached 70° C. To the heated mixture, 43.3 parts by mass of styrene, 23.3 parts by mass of butyl acrylate, and 18.0 parts by mass of a 1% by mass ascorbic acid aqueous solution were added by dripping over the course of 2 hours.

After the dripping, the resulting mixture was matured for 4 hours at 70° C., to thereby obtain Dispersion Liquid 4 of resin particles (B2) including, as constituent components, the core resin (b1) and a shell resin (b2) in each particle, where the shell resin (b2) was a polymer obtained by copolymerizing the tert-butyl hydroperoxide, the styrene, and the butyl acrylate.

A volume average particle dimeter of the resin particles (B2) in Dispersion Liquid 4 was measured in the same manner as in the measurement of the volume average particle diameter of the resin particles (B1). As a result, the volume average particle diameter of the resin particles (B2) was 51.5 nm. Moreover, Dispersion Liquid 4 was neutralized with a 10% by mass ammonia solution to be pH 9.0. Centrifuge separation of the resulting dispersion liquid was performed. The separated sediment was dried and solidified to thereby separate the shell resin (b2). A glass transition temperature (Tg) of the shell resin (b2) was measured in the same manner as the measurement of the glass transition temperature (Tg) of the core resin (b1). As a result, the glass transition temperature (Tg) of the shell resin (b2) was 55° C.

The structure of the resin particles (B2) in Dispersion Liquid 4 was confirmed in the same manner as the confirmation method performed on Dispersion Liquid 2. As a result, it was confirmed that each of the resin particles (B2) had a core-shell structure.

<Synthesis of Amorphous Polyester Resin>

A reaction vessel equipped with a cooling tube, a stirrer, a heating and cooling device, a thermometer, and a nitrogen inlet tube was charged with 425 parts by mass of a bisphenol A-PO (2 mol) adduct, 100 parts by mass of propylene glycol, 634 parts by mass of a terephthalic acid-propylene glycol (2 mol) adduct, and 0.5 parts by mass of titanium diisopropoxybis(triethanolaminate) serving as a condensation catalyst. The resulting mixture was allowed to react for 12 hours at 230° C.

Subsequently, the resulting product was further allowed to react under the reduced pressure of from 10 mmHg through 15 mmHg. The resulting product was cooled to 180° C., followed by adding 30 parts by mass of trimellitic anhydride. The mixture was allowed to react for 1 hour at 180° C., followed by collecting the reaction product. The collected reaction product was cooled to room temperature to thereby obtain an amorphous polyester resin.

The amorphous polyester resin had a glass transition temperature (Tg) of 42° C., a number average molecular weight (Mn) of 2,400, a weight average molecular weight (Mw) of 5,400, a hydroxyl value of 32 mgKOH/g, and an acid value of 18 mgKOH/g.

<Production Example of Colorant Dispersion Liquid>

A reaction vessel equipped with a cooling tube, a stirrer, a heating and cooling device, a thermometer, and a nitrogen-inlet tube was charged with 557 parts by mass of propylene glycol, 569 parts by mass of dimethyl terephthalate, 184 parts by mass of adipic acid, and 3 parts by mass of tetrabutoxy titanate serving as a condensation catalyst. The resulting mixture was allowed to react for 8 hours at 180° C. under nitrogen flow, with removing methanol generated.

Subsequently, the reaction mixture was further reacted for 4 hours under nitrogen flow with gradually heating to 230° C. and removing propylene glycol and water generated. The reaction mixture was allowed to further react for 1 hour under the reduced pressure of from 0.007 MPa through 0.026 MPa.

The resulting reaction mixture was cooled to 180° C., followed by adding 121 parts of trimellitic anhydride. The resulting mixture was allowed to react for 2 hours under atmospheric pressure in a sealed condition, followed by heating to 220° C. under atmospheric pressure. The reaction was continued until a softening point of the reaction product was to be 180° C., to thereby obtain a polyester resin (number average molecular weight (Mn)=8,500).

A beaker was charged with 20 parts by mass of copper phthalocyanine, 4 parts by mass of a dispersing agent (SOLSPERSE 28000, available from The Lubrizol Corporation), 20 parts by mass of the polyester resin, and 56 parts by mass of ethyl acetate. The resulting mixture was stirred to homogeneously disperse the materials, followed by finely dispersing the copper phthalocyanine by means of a bead mill, to thereby obtain a colorant dispersion liquid. A volume average particle diameter of the particles in the colorant dispersion liquid was 0.2 μm.

<Production Example of Release Agent Dispersion Liquid>

A pressure-resistant reaction vessel equipped with a stirrer, a heating and cooling device, a thermometer, and a gas cylinder for dripping was charged with 454 parts by mass of xylene, and 150 parts of low-molecular weight polyethylene (SANWAX LEL-400, available from SANYO CHEMICAL CO., LTD.). After nitrogen purging, the resultant mixture was heated to 170° C. with stirring. At 170° C., a mixed solution including 595 parts by mass of styrene, 255 parts by mass of methyl methacrylate, 34 parts by mass of di-t-butyl peroxy hexahydro terephthalate, and 119 parts by mass of xylene was added by dripping over the course of 3 hours, and the temperature of the resultant mixture was maintained at 170° C. for 30 minutes.

Subsequently, the xylene was removed from the mixture under the reduced pressure of 0.039 MPa to thereby obtain modified wax.

An SP value of the graft chain of the modified wax was 10.35 $(cal/cm^3)^{1/2}$. Moreover, the modified wax had a number average molecular weight (Mn) of 1,900, a weight average molecular weight (Mw) of 5,200, and a glass transition temperature (Tg) of 57° C.

A reaction vessel equipped with a cooling tube, a stirrer, a heating and cooling device, and a thermometer was charged with 10 parts by mass of paraffin wax (HNP-9, available from Nippon Seiro Co., Ltd.), 1 part by mass of the modified wax, and 33 parts by mass of ethyl acetate. The resulting mixture was stirred for 30 minutes at 78° C. The resulting mixture was cooled down to 30° C. over the course of 1 hour to crystalize and precipitate the paraffin wax into particles. The resulting paraffin wax particles were wet pulverized by ULTRA VISCOMILL (available from AIMEX CO., LTD.), to thereby obtain a release agent dispersion liquid. A volume average particle diameter of the particles in the release agent dispersion liquid was 0.25 μm.

<Production Example of Reactive Prepolymer>

A reaction vessel equipped with a cooling tube, a stirrer, and a nitrogen inlet tube was charged with 3-methyl-1,5-pentanediol, isophthalic acid, adipic acid, and trimellitic anhydride together with titanium tetraisopropoxide (1,000 ppm relative to the resin component) in a manner that a molar ratio OH/COOH of a hydroxyl group to a carboxyl group was to be 1.5, a proportion of the 3-methyl-1,5-pentanediol to a diol component was to be 100 mol %, a dicarboxylic acid component was to be made up of the isophthalic acid (40 mol %) and the adipic acid (60 mol %), and an amount of the trimellitic anhydride was to be 1 mol % relative to a total amount of the monomers.

The resulting mixture was heated to 200° C. over the course of approximately 4 hours, followed by heating to 230° C. for 2 hours. The reaction was continued until generation of effluent stopped.

Thereafter, the resulting product was allowed to react for 5 hours under the reduced pressure of from 10 mmHg through 15 mmHg, to thereby obtain Intermediate Polyester C-1.

Next, a reaction vessel equipped with a cooling tube, a stirrer, and a nitrogen inlet tube was charged with Intermediate Polyester C-1 and isophorone diisocyanate (IPDI) at a molar rate (isocyanate group of IPDI/hydroxyl group of intermediate polyester) of 2.0. The resulting mixture was diluted with ethyl acetate to prepare a 50% ethyl acetate solution. The 50% ethyl acetate solution was allowed to react for 5 hours at 100° C. to thereby obtain a reactive prepolymer.

Example 1

<Preparation of Aqueous Phase>

A beaker was charged with 165 parts by mass of ion-exchanged water, 10 parts by mass of Dispersion Liquid 1, 5 parts by mass of Dispersion Liquid 2, 1 part by mass of sodium carboxymethylcellulose, 26 parts by mass of sodium dodecyldiphenyl ether disulfate (ELEMINOL MON-7, available from SANYO CHEMICAL CO., LTD.), and 15 parts by mass of ethyl acetate. The resulting mixture was mixed to obtain an aqueous phase.

<Preparation of Oil Phase>

The amorphous polyester resin (71 parts by mass), 40 parts by mass of the colorant dispersion liquid, 39 parts by mass of the release agent dispersion liquid, and 54 parts by mass of ethyl acetate were mixed together, followed by adding 18 parts by mass of the reactive prepolymer and 0.3 parts by mass of isphorone diamine serving as a curing agent to thereby obtain an oil phase.

<Formation of Composite Particles>

The entire amount of the aqueous phase was added to the oil phase, and the resulting mixture was stirred by means of TK Auto Homomixer for 2 minutes to prepare a mixture. The prepared mixture was transferred into a reaction vessel equipped with a stirrer and a thermometer. The mixture was processed at 50° C. until a concentration of the ethyl acetate was to be 0.5% by mass or less, to thereby obtain an aqueous dispersion liquid of composite particles. The shapes of the composite particles included in the composite particle aqueous dispersion liquid were observed under a scanning electron microscope (SU-8230, available from High-Tech Corporation). As a result, toner base particles each covered with resin particles were observed.

Next, pH of the aqueous dispersion liquid of the composite particles was adjusted to 12 with sodium hydroxide, followed by stirring by means of a Three-One-Motor for 1 hour. Thereafter, the resulting dispersion liquid was filtered by centrifugal filtration. Ion-exchanged water was added to the filtration cake to form slurry. After repeating processes of performing centrifugal filtration and forming slurry a few times, the resulting slurry was filtered by suction filtration using a membrane filter. This series of processes may be simply referred to as "washing and filtering" hereinafter. The resulting filtration cake was dried for 18 hours at 40° C. to reduce the volatile component to 0.5% by mass or less, to thereby obtain a toner precursor.

<External Addition Treatment>

To 100 parts by mass of the toner precursor, 1.5 parts by mass of hydrophobic silica particles (volume average particle diameter: 50 nm), 1.0 part by mass of hydrophobic titanium oxide (volume average particle diameter: 20 nm), and 0.12 parts by mass of zinc stearate particles all serving as external additives were added. The resulting mixture was mixed by means of HENSCHEL MIXER (available from NIPPON COKE & ENGINEERING CO., LTD.), to thereby obtain Toner 1. Toner 1 obtained was provided for measurement of a coverage rate of the toner base particle with the resin particles, and a release amount of zinc derived from the zinc stearate particles. The measurement was performed in the following manner. As a result, the coverage rate was 70%, and the release amount was 0.010% by mass.

Moreover, a volume average particle diameter of the zinc stearate particles was measured in the following manner. As a result, the volume average particle diameter of the zinc stearate particles was 10 μm.

<Measurement of Coverage Rate of Toner Base Particle with Resin Particles>

A measuring method of the coverage rate was as follows. After applying ultrasonic waves to remove the external additives as much as possible in accordance with a released treatment for the external additives, the resin particles covering each toner base particle were observed under a scanning electron microscope (SEM).

The external additive-releasing treatment was carried out by releasing the external additive particles from the toner base particles as in [1] and [2] below under the conditions described in [Ultrasonic wave conditions].

[1] A 100 mL screw vial was charged with 50 mL of a 5% by mass surfactant aqueous solution (product name: NOIGEN ET-165, available from DKS Co., Ltd.) and 3 g of the toner, and the surfactant aqueous solution and the toner were mixed to prepare a dispersion solution. The resulting dispersion solution was agitated by gently shaking the vial in up-down and left-right motion. Then, the resulting dispersion solution was stirred by means of a ball mill for 30 minutes to homogeneously disperse the toner in the dispersion solution.

[2] Then, ultrasonic energy was applied to the resulting dispersion solution by means of an ultrasonic homogenizer (product name: Homogenizer, type: VCX750, CV33, available from SONICS & MATERIALS, INC.) under [Ultrasonic wave conditions] below.

[Ultrasonic Wave Conditions]

Vibration duration: continuous 60 minutes

Amplitude: 40 W

Vibration onset temperature: 23° C.±1.5° C.

Temperature during vibration: 23° C.±1.5° C.

[3](1) The dispersion liquid was filtered by vacuum filtration using filter paper (product name: Quantitative filter paper (No. 2, 110 mm), available from Advantec Toyo Kaisha, Ltd.). The resulting filtration cake was washed twice with ion-exchanged water, followed by performing filtration to remove free additive particles. Then, the collected base particles of the toner sample were dried.

(2) An SEM image of the base particles of the toner sample collected in (1) was captured by a scanning electron microscope (SEM). Every time an SEM image was captured, another SEM image was also captured from the direction orthogonal to the direction from which the first SEM image was captured. In this manner, 20 or more SEM images were captured in total. First, a backscattered electron image was observed to detect the external additive and/or filler particles including Si.

(3) The image of (2) was binarized using image processing software (ImageJ) to eliminate the external additive and/or filler.

Next, the section of the toner identical to the observation section of (2) was observed to acquire a secondary electron image. Since the resin particles could not be detected on the backscattered electron image and could be detected only on the secondary electron image, the secondary electron image was compared to the image obtained in (3) to determine, as the resin particles, the particles present on the regions other than the regions of the residual external additive and/or filler (other than the regions excluded in (3)).

[Image Capturing Conditions]

Scanning electron microscope: SU-8230 (available from Hitachi High-Tech Corporation)

Image capturing magnification: 35,000×

Captured image: secondary electron (SE(L)) image, backscattered electron (BSE) image Acceleration voltage: 2.0 kV Acceleration current: 1.0 μA Probe current: Normal Focus mode: UHR WD: 8.0 mm <Measurement of Release Amount of Zinc Derived from Zinc Stearate Particles>

A 500 mL beaker was charged with 10 g of polyoxyalkylene alkyl ether (product name: NOIGEN ET-165, available from DKS Co., Ltd.) and 300 mL of pure water, and ultrasonic waves were applied to the resulting mixture for 1 hour to disperse the mixture, to thereby prepare a dispersion liquid A. The dispersion liquid A was transferred into a 2 L measuring flask and was diluted to meet the predetermined total volume. The diluted dispersion liquid was dissolved by applying ultrasonic waves for 1 hour to thereby prepare a dispersion liquid B including 0.5% polyoxyalkylene alkyl ether.

The dispersion liquid B (50 mL) was poured into a 110 mL screw tube bottle. To the screw tube bottle, 3.75 g of the toner used as a sample (may be referred to as a "toner sample before treatment" hereinafter) was added. Then, the screw tube bottle was agitated for from 30 minutes through 90 minutes until the screw tube bottle was wet with the dispersion liquid B, with minimizing the rotations as much as possible so that air bubbles would not form. In the manner as described, a dispersion liquid C was prepared.

A vibrating part of an ultrasonic homogenizer (VCX750, available from SONICS & Materials, Inc., 20 kHz, 750 W) was put into the dispersion liquid C by 2.5 cm in depth, and ultrasonic vibration was applied for 1 minute at output energy of 40% to prepare a dispersion liquid D.

A 50 mL centrifuge tube was charged with the dispersion liquid D, and centrifuge separation was performed for 2 minutes at 2,000 rpm to yield a supernatant and sediment. The collected sediment was transferred into a separatory funnel with washing using 60 mL of pure water, followed by performing vacuum filtration to remove the washing water.

The filtration cake collected after the filtration and 60 mL of pure water were poured into a cup, and the resulting mixture was slowly mixed 5 times with a handle of a spatula, followed by performing vacuum filtration to remove the washing water. The toner left on the filtration paper was collected, and dried for 8 hours in a thermostat set to a temperature of 40° C. The dried toner (3 g) was molded into a pellet having a diameter of 3 mm and a thickness of 2 mm by means of an automatic press pelletizer (T-BRB-32, available from Maekawa Testing Machine MFG. CO., LTD., load: 6.0 t, duration of press: 60 seconds) to thereby prepare a toner sample after treatment.

Similarly, the toner was molded into a pellet having a diameter of 3 mm and a thickness of 2 mm to prepare a toner sample before treatment.

The amount (% by mass) of the zinc included in the toner sample after the treatment and the amount (% by mass) of the zinc included in the toner sample before the treatment were measured by means of an X-ray fluorescence spectrometer (ZSX-100e, available from Rigaku Corporation), and the release amount (% by mass) of the zinc was calculated according to Formula 1 below. The calibration curve used was prepared using toner samples including 0.1 parts, 1 part, and 1.8 parts of zinc, respectively, relative to 100 parts of the toner.

Release amount of zinc(% by mass)=(amount[% by mass] of zinc in toner sample before treatment−amount[% by mass] of zinc in toner sample after treatment)/amount[% by mass] of toner sample before treatment×100    Formula 1

<Measurement of Volume Average Particle Diameter of Zinc Stearate Particles>

A small amount of the toner, to which the external additive treatment had been performed by means of Henschel Mixer, was collected, and a SEM photograph of the zinc stearate particles of the collected toner was taken by means of a scanning electron microscope under the image capturing conditions.

[Image Capturing Conditions]

Scanning electron microscope: SU-8230 (available from Hitachi High-Tech Corporation)

Image capturing magnification: 35,000×

Captured image: secondary electron (SE(L)) image, backscattered electron (BSE) image Acceleration voltage: 2.0 kV Acceleration current: 1.0 μA Probe current: Normal Focus mode: UHR WD: 8.0 mm The maximum length of the randomly-selected zinc stearate particle (the number of particles measured: 100 particles or more and 200 particles or less) was measured from the captured SEM image using image analysis software ImageJ to calculate the volume average particle diameter of the zinc stearate particles. For the calculation of the volume average particle diameter, five sets of the zinc stearate particles were measured. When 80% or greater percentage of the measurement results fell in the range of 3 μm or greater and 20 μm or less, it was determined that the numerical range of the volume average particle diameter of the zinc stearate particles of the present disclosure was satisfied.

Example 2

Toner 2 was obtained in the same manner as in Example 1, except that 10 parts by mass of Dispersion Liquid 1 was replaced with 7.5 parts by mass of Dispersion Liquid 1, and 5 parts by mass of Dispersion Liquid 2 was replaced with 7.5 parts by mass of Dispersion Liquid 2.

The coverage rate of each of the toner base particles with the resin particles and the release amount of the zinc derived from the zinc stearate particles were measured on Toner 2 in the same manner as in Example 1. As a result, the coverage rate was 70%, and the release amount was 0.014% by mass.

Example 3

Toner 3 was obtained in the same manner as in Example 1, except that 10 parts by mass of Dispersion Liquid 1 was replaced with 5 parts by mass of Dispersion Liquid 1, and 5 parts by mass of Dispersion Liquid 2 was replaced with 10 parts by mass of Dispersion Liquid 2.

The coverage rate of each of the toner base particles with the resin particles and the release amount of the zinc derived from the zinc stearate particles were measured on Toner 3 in the same manner as in Example 1. As a result, the coverage rate was 50%, and the release amount was 0.012% by mass.

Example 4

Toner 4 was obtained in the same manner as in Example 3, except that the zinc stearate particles (volume average particle diameter: 10 μm) serving as the external additive were replaced with zinc stearate particles (volume average particle diameter: 6 μm).

The coverage rate of each of the toner base particles with the resin particles and the release amount of the zinc derived from the zinc stearate particles were measured on Toner 4 in the same manner as in Example 1. As a result, the coverage rate was 50%, and the release amount was 0.008% by mass.

Example 5

Toner 5 was obtained in the same manner as in Example 3, except that the zinc stearate particles (volume average particle diameter: 10 μm) serving as the external additive were replaced with zinc stearate particles (volume average particle diameter: 3 μm).

The coverage rate of each of the toner base particles with the resin particles and the release amount of the zinc derived from the zinc stearate particles were measured on Toner 5 in the same manner as in Example 1. As a result, the coverage rate was 50%, and the release amount was 0.005% by mass.

Example 6

Toner 6 was obtained in the same manner as in Example 3, excepted that the zinc stearate particles (volume average particle diameter: 10 μm) serving as the external additive were replaced with zinc stearate particles (volume average particle diameter: 14 μm).

The coverage rate of each of the toner base particles with the resin particles and the release amount of the zinc derived from the zinc stearate particles were measured on Toner 6 in the same manner as in Example 1. As a result, the coverage rate was 50%, and the release amount was 0.017% by mass.

Example 7

Toner 7 was obtained in the same manner as in Example 3, except that zinc stearate particles (volume average particle diameter: 10 μm) serving as the external additive were replaced with zinc stearate particles (volume average particle diameter: 20 μm).

The coverage rate of each of the toner base particles with the resin particles and the release amount of the zinc derived from the zinc stearate particles were measured on Toner 7 in the same manner as in Example 1. As a result, the coverage rate was 50%, and the release amount was 0.020% by mass.

Comparative Example 1

Toner 8 was obtained in the same manner as in Example 1, except that 10 parts by mass of Dispersion Liquid 1 was replaced with 10 parts by mass of Dispersion Liquid 3, 5 parts by mass of Dispersion Liquid 2 was replaced with 5 parts by mass of Dispersion Liquid 4, and zinc stearate particles (volume average particle diameter: 10 μm) serving as the external additive were replaced with zinc stearate particles (volume average particle diameter: 1.5 μm).

The coverage rate of each of the toner base particles with the resin particles and the release amount of the zinc derived from the zinc stearate particles were measured on Toner 8 in the same manner as in Example 1. As a result, the coverage rate was 80%, and the release amount was 0.004% by mass.

Comparative Example 2

Toner 9 was obtained in the same manner as in Comparative Example 1, except that the zinc stearate particles (volume average particle diameter: 10 μm) serving as the external additive were replaced with zinc stearate particles (volume average particle diameter: 25 μm).

The coverage rate of each of the toner base particles with the resin particles and the release amount of the zinc derived from the zinc stearate particles were measured on Toner 9 in the same manner as in Example 1. As a result, the coverage rate was 80%, and the release amount was 0.024% by mass.

Comparative Example 3

Toner 10 was obtained in the same manner as in Example 1, except that 10 parts by mass of Dispersion Liquid 1 was replaced with 3.75 parts by mass of Dispersion Liquid 3, 5 parts by mass of Dispersion Liquid 2 was replaced with 11.25 parts by mass of Dispersion Liquid 4, and the zinc stearate particles (volume average particle diameter: 10 μm) serving as the external additive were replaced with zinc stearate particles (volume average particle diameter: 3 μm).

The coverage rate of each of the toner base particles with the resin particles and the release amount of the zinc derived from the zinc stearate particles were measured on Toner 10 in the same manner as in Example 1. As a result, the coverage rate was 20%, and the release amount was 0.003% by mass.

Comparative Example 4

Toner 11 was obtained in the same manner as in Comparative Example 3, except that the zinc stearate particles (volume average particle diameter: 3 μm) serving as the external additive were replaced with zinc stearate particles (volume average particle diameter: 20 μm).

The coverage rate of each of the toner base particles with the resin particles and the release amount of the zinc derived from the zinc stearate particles were measured on Toner 11 in the same manner as in Example 1. As a result, the coverage rate was 20%, and the release amount was 0.016% by mass.

Comparative Example 5

Toner 12 was obtained in the same manner as in Comparative Example 3, except that the zinc stearate particles (volume average particle diameter: 3 μm) serving as the external additive were replaced with zinc stearate particles (volume average particle diameter: 25 μm).

The coverage rate of each of the toner base particles with the resin particles and the release amount of the zinc derived from the zinc stearate particles were measured on Toner 12 in the same manner as in Example 1. As a result, the coverage rate was 20%, and the release amount was 0.022% by mass.

Comparative Example 6

Toner 13 was obtained in the same manner as in Example 3, except that the zinc stearate particles (volume average particle diameter: 10 μm) serving as the external additive were replaced with zinc stearate particles (volume average particle diameter: 1.5 μm).

The coverage rate of each of the toner base particles with the resin particles and the release amount of the zinc derived from the zinc stearate particles were measured on Toner 13 in the same manner as in Example 1. As a result, the coverage rate was 50%, and the release amount was 0.006% by mass.

Comparative Example 7

Toner 14 was obtained in the same manner as in Example 3, except that the zinc stearate particles (volume average particle diameter: 10 μm) serving as the external additive were replaced with zinc stearate particles (volume average particle diameter: 25 μm).

The coverage rate of each of the toner base particles with the resin particles and the release amount of the zinc derived from the zinc stearate particles were measured on Toner 14 in the same manner as in Example 1. As a result, the coverage rate was 50%, and the release amount was 0.021% by mass.

Heat-resistant storage stability and cleaning properties of Toners 1 to 14 obtained in Examples 1 to 7 and Comparative Examples 1 to 7, respectively, or developers including Toners 1 to 14, respectively, were evaluated. The results are presented in Tables 1 and 2.

<Heat-Resistant Storage Stability>

A 50 mL glass container was charged with 10 g of each toner, and the glass container was adequately tapped until no change was observed in the apparent density of the toner, followed by placing a lid on the container. After leaving the toner to stand for 24 hours in a thermostat chamber set to a temperature of 50° C., followed by cooling to 24° C., a penetration degree was measured in accordance with a penetration degree test (JIS K2235-1991), and "heat-resistant storage stability" was evaluated based on the following evaluation criteria.

The larger the penetration degree is, the more excellent the heat-resistant storage stability is. According to the evaluation criteria below, "Fair" or better results are the levels applicable for practical use.

—Evaluation Criteria—

Excellent: The penetration degree was 25 mm or greater.

Good: The penetration degree was 20 mm or greater and less than 25 mm.

Fair: The penetration degree was 15 mm or greater and less than 20 mm

Poor: The penetration degree was less than 15 mm.

<Cleaning Properties>

A digital full-color multifunction peripheral (apparatus name: Imagio MP C5000, available from Ricoh Company Limited) was loaded with a developer including each toner. Then, a solid image was printed on sheets of My Paper (A4 size, available from Ricoh Company Limited) serving as recording media with a toner deposition amount of 1.0 mg/cm$^2$. At the initial stage of the printing, and after a certain period of the printing, the residual toner on the photoconductor after cleaning was transferred onto white paper with SCOTCH TAPE (available from 3M), and reflection density was measured by means of a reflection densitometer (device name: RD514, available from Videojet X-Rite K.K.). The above-mentioned initial stage of the printing was the timing after printing 1,000 sheets by means of the digital full-color multifunction peripheral. The above-mentioned time after the certain period of the printing was the timing after printing 100,000 sheets by means of the digital full-color multifunction peripheral. "Cleaning properties" were evaluated based on the following evaluation criteria.

—Evaluation Criteria—

Excellent: A difference in reflection density between the initial stage and after the certain period was less than 0.01.

Good: A difference in reflection density between the initial stage and after the certain period was 0.01 or greater and less than 0.025.

Fair: A difference in reflection density between the initial stage and after the certain period was 0.025 or greater and less than 0.05.

Poor: A difference in reflection density between the initial stage and after the certain period was 0.05 or greater.

TABLE 1

| | | Example | | | | | | |
|---|---|---|---|---|---|---|---|---|
| | | 1 | 2 | 3 | 4 | 5 | 6 | 7 |
| Toner No. | | 1 | 2 | 3 | 4 | 5 | 6 | 7 |
| Volume average particle diameter of resin particles (μm) | | 0.015 | 0.015 | 0.015 | 0.015 | 0.015 | 0.015 | 0.015 |
| Volume average particle diameter of zinc stearate particles (μm) | | 10 | 10 | 10 | 6 | 3 | 14 | 20 |
| Coverage rate of toner base particle with resin particles (%) | | 30 | 70 | 50 | 50 | 50 | 50 | 50 |
| Release amount of zinc from toner base particles (% by mass) | | 0.010 | 0.014 | 0.012 | 0.008 | 0.005 | 0.017 | 0.020 |
| Evaluation results | Heat-resistant storage stability | Good | Good | Excellent | Excellent | Excellent | Excellent | Excellent |
| | Cleaning properties | Excellent | Excellent | Excellent | Excellent | Good | Excellent | Good |

TABLE 2

| | Comparative Example | | | | | | |
|---|---|---|---|---|---|---|---|
| | 1 | 2 | 3 | 4 | 5 | 6 | 7 |
| Toner No. | 8 | 9 | 10 | 11 | 12 | 13 | 14 |
| Volume average particle diameter of resin particles (μm) | 0.045 | 0.045 | 0.045 | 0.045 | 0.045 | 0.045 | 0.045 |
| Volume average particle diameter of zinc stearate particles (μm) | 1.5 | 25 | 3 | 20 | 25 | 1.5 | 25 |

TABLE 2-continued

| | | Comparative Example | | | | | | |
|---|---|---|---|---|---|---|---|---|
| | | 1 | 2 | 3 | 4 | 5 | 6 | 7 |
| Coverage rate of toner base particle with resin particles (%) | | 80 | 80 | 20 | 20 | 20 | 50 | 50 |
| Release amount of zinc from toner base particles (% by mass) | | 0.004 | 0.024 | 0.003 | 0.016 | 0.022 | 0.006 | 0.021 |
| Evaluation results | Heat-resistant storage stability | Fair | Fair | Poor | Poor | Poor | Excellent | Excellent |
| | Cleaning properties | Poor | Poor | Fair | Good | Poor | Poor | Poor |

All of Examples 1 to 7 had the excellent evaluation results of heat-resistant storage stability and cleaning properties.

Conversely, Comparative Examples 1 and 6 had the lower release amount of the zinc derived from the zinc stearate particles as the average particle diameter of the zinc stearate particles was less than 3 μm. Therefore, an effect of the zinc stearate particles coating a photoconductor was low, consequently impairing cleaning properties.

In Comparative Examples 2 and 7, the average particle diameter of the zinc stearate particles was greater than 20 μm, thus the amount of the zinc stearate particles captured by a cleaning blade increased. As a result, an effect of the zinc stearate particles coating a photoconductor was low, consequently impairing cleaning properties.

In Comparative Examples 3 and 4, the coverage rate of each of the toner base particles with the resin particles was less than 30%. As a result, the strength of the toner base particles was low, consequently impairing heat-resistant storage stability.

In Comparative Example 5, the coverage rate of each of the toner base particles with the resin particles was less than 30%, consequently impairing heat-resistant storage stability. As the average particle diameter of the zinc stearate particles was less than 3 μm, moreover, the release amount of the zinc was small, consequently impairing cleaning properties.

For example, embodiments of the present disclosure are as follows.

<1> A toner including:

toner particles, each of the toner particles including:
- a toner base particle including a binder resin;
- resin particles covering the toner base particle; and
- zinc stearate particles serving as an external additive, wherein, in each of the toner particles, a coverage rate of the toner base particle with the resin particles is 30% or greater and 70% or less, and wherein the zinc stearate particles have a volume average particle diameter of 3 μm or greater and 20 μm or less.

<2> The toner according to <1>, wherein the volume average particle diameter of the zinc stearate particles is 5 μm or greater and 15 μm or less.

<3> The toner according to <1> or <2>, wherein an amount of zinc released from the toner is 0.005% by mass or greater, where the zinc is derived from the zinc stearate particles.

<4> The toner according to any one of <1> to <3>, wherein the coverage rate of the toner base particle with the resin particles is 40% or greater and 60% or less.

<5> A developer including:

a carrier; and the toner according to any one of <1> to <4>.

<6> A toner storage unit including:

the toner according to any one of <1> to <4>; and a unit in which the toner is stored.

<7> An image forming apparatus including:

an electrostatic latent image bearer;

an electrostatic latent image forming unit configured to form an electrostatic latent image on the electrostatic latent image bearer;

a developing unit that stores the toner according to any one of <1> to <4> or the developer according to <5> and is configured to develop the electrostatic latent image with the toner or the developer to form a visible image;

a transferring unit configured to transfer the visible image to a recording medium; and a fixing unit configured to fix the visible image transferred to the recording medium.

<8> An image forming method including:

forming an electrostatic latent image on an electrostatic latent image bearer;

developing the electrostatic latent image with the toner according to any one of <1> to <4> or the developer according to <5> to form a visible image;

transferring the visible image to a recording medium; and fixing the visible image transferred to the recording medium.

The toner according to any one of <1> to <4>, the developer according to <5>, the toner storage unit according to <6>, the image forming apparatus according to <7>, and the image forming method according to <8> can solve the above-described various problems existing in the art, and can achieve the object of the present disclosure.

What is claimed is:

1. A toner comprising:

toner particles, each of the toner particles including:
- a toner base particle including a binder resin;
- resin particles covering the toner base particle; and
- zinc stearate particles serving as an external additive, wherein, in each of the toner particles, a coverage rate of the toner base particle with the resin particles is 30% or greater and 70% or less, wherein the zinc stearate particles have a volume average particle diameter of 3 μm or greater and 20 μm or less, and wherein an amount of zinc released from the toner is 0.005% by mass or greater and 0.06% by mass or less, where the zinc is derived from the zinc stearate particles.

2. The toner according to claim 1, wherein the volume average particle diameter of the zinc stearate particles is 5 μm or greater and 15 μm or less.

3. The toner according to claim 1, wherein the coverage rate of the toner base particle with the resin particles is 40% or greater and 60% or less.

4. A developer comprising:

a carrier; and the toner according to claim 1.

5. A toner storage unit comprising:

the toner according to claim 1; and a unit in which the toner is stored.

6. An image forming apparatus comprising:

an electrostatic latent image bearer;

an electrostatic latent image forming unit configured to form an electrostatic latent image on the electrostatic latent image bearer;

a developing unit that stores the toner according to claim 1 and is configured to develop the electrostatic latent image with the toner or the developer to form a visible image;

a transferring unit configured to transfer the visible image to a recording medium; and a fixing unit configured to fix the visible image transferred to the recording medium.

7. An image forming method comprising:

forming an electrostatic latent image on an electrostatic latent image bearer;

developing the electrostatic latent image with the toner according to claim 1 to form a visible image;

transferring the visible image to a recording medium; and fixing the visible image transferred to the recording medium.

8. The toner according to claim 1, wherein the toner is negatively charged.

9. The toner according to claim 1, wherein the volume average particle diameter of the zinc stearate particles is greater than 10 μm and 20 μm or less.

* * * * *